(12) United States Patent
Sakamoto et al.

(10) Patent No.: US 8,163,863 B2
(45) Date of Patent: Apr. 24, 2012

(54) POLYSILANE AND POLYSILANE-CONTAINING RESIN COMPOSITION

(75) Inventors: Hiroki Sakamoto, Osaka (JP); Hiroaki Murase, Osaka (JP); Tsuyoshi Fujiki, Osaka (JP); Shingo Osawa, Osaka (JP); Yoshiyuki Morita, Tatsuno (JP); Tetsuya Hosomi, Tatsuno (JP); Nobuaki Aoki, Tatsuno (JP)

(73) Assignee: Osaka Gas Co., Ltd., Osaka (JP)

( * ) Notice: Subject to any disclaimer, the term of this patent is extended or adjusted under 35 U.S.C. 154(b) by 500 days.

(21) Appl. No.: 12/096,050

(22) PCT Filed: Dec. 1, 2006

(86) PCT No.: PCT/JP2006/324073
§ 371 (c)(1),
(2), (4) Date: Jan. 22, 2009

(87) PCT Pub. No.: WO2007/066594
PCT Pub. Date: Jun. 14, 2007

(65) Prior Publication Data
US 2009/0156775 A1   Jun. 18, 2009

(30) Foreign Application Priority Data
Dec. 7, 2005   (JP) ................................ 2005-353963

(51) Int. Cl.
*C08G 77/48* (2006.01)
*C08G 77/60* (2006.01)

(52) U.S. Cl. .......................... 528/31; 528/30

(58) Field of Classification Search ............ 528/30, 528/31
See application file for complete search history.

(56) References Cited

U.S. PATENT DOCUMENTS

| 4,639,501 A | 1/1987 | Seyferth et al. |
| 5,359,106 A | 10/1994 | Tabei et al. |

FOREIGN PATENT DOCUMENTS

| FR | 2616152 | 12/1988 |
| JP | 3-17131 | 1/1991 |
| JP | 4-13726 | 1/1992 |
| JP | 4-363327 | 12/1992 |
| JP | 05/039358 | 2/1993 |
| JP | 5-170947 | 7/1993 |
| JP | 06-192429 | 7/1994 |
| JP | 7-239487 | 9/1995 |
| JP | 8-510292 | 10/1996 |
| JP | 9-241385 | 9/1997 |
| JP | 11-35688 | 2/1999 |
| JP | 11-189652 | 7/1999 |
| JP | 2001-48986 | 2/2001 |
| JP | 2002-226586 | 8/2002 |
| JP | 2003-277507 | * 2/2003 |
| JP | 2003-277507 | * 10/2003 |
| WO | 98/29476 | 7/1998 |

OTHER PUBLICATIONS

Kashimura et al., Electroreductive Synthesis of Polysilanes, Polygermanes, and Related Polymers with Magnesium Electrodes, J. Org. Chem. 1999, 64, 6615-6621.*
International Search Report issued in PCT/JP2006/324073, dated Mar. 6, 2007, 3 pages.
English translation of the Written Opinion of the International Searching Authority issued in PCT/JP2006/324073, dated. Mar. 6, 2007, 3 pages.
Yu-Ling Hsiao et al., Free-Radical. Hydrosilylation of Poly(phenylsilane): Synthesis of Functional Polysilanes, Journal of the American Chemical Society, 1994,, vol. 116, No. 21, pp. 9779-9780.
Supplementary European Search Report dated Dec. 14, 2011 of EP Appl No. 06823552.2 (6 pages).

* cited by examiner

*Primary Examiner* — Ling Choi
*Assistant Examiner* — Chun-Cheng Wang
(74) *Attorney, Agent, or Firm* — Pillsbury Winthrop Shaw Pittman, LLP

(57) ABSTRACT

A polysilane having excellent functionalities (e.g., solubility in a solvent and reactivity) is obtained by introducing a structural unit of the following formula (1) to a polysilane through a reaction of a dihalosilane having a Si—H bond and adding a hydrosilylatable compound (e.g., a compound having a carbon-carbon unsaturated bond) to the Si—H bond,

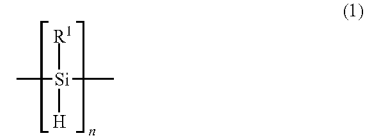

(1)

wherein $R^1$ represents a hydrogen atom, an organic group, or a silyl group; and "n" denotes an integer of not less than 1.

11 Claims, No Drawings

POLYSILANE AND POLYSILANE-CONTAINING RESIN COMPOSITION

CROSS REFERENCE TO RELATED APPLICATIONS

This is the U.S. National Phase of PCT/JP2006/324073, filed Dec. 1, 2006, which in turn claims priority to Japanese patent application no. 2005-353963, filed Dec. 7, 2005, the contents of both of which are incorporated herein in their entirety by reference.

TECHNICAL FIELD

The present invention relates to a functional polysilane, which is a polysilane having an imparted excellent functionality (e.g., solubility in a solvent and reactivity), a process for producing the polysilane, and a resin composition containing the polysilane.

BACKGROUND ART

A polysilane is a high-molecular compound having a silicon-silicon bond as a main chain and is a material having various physical properties (for example, heat resistance, high refractive index, photoreactivity, hole transportability, luminescence, etching resistance, and low dielectric constant). From such excellent physical properties, the polysilane is attracting the attention as a ceramic precursor, an interlayer insulation film, and a photoelectric material (for example, a photo resist, a photoelectrically photographic material such as an organic photoreceptor, an optically transmissive material such as a light guide, an optically recording material such as an optical memory, and an electroluminescent device).

For such an application, the polysilane is practically used or applied in the form of a thin film. To form the thin film, the polysilane is usually required to have solubility in a solvent (an organic solvent), however, the solubility is sometimes insufficient depending on the species of the polysilane. In particular, since a polysilane having a regular structure (e.g., a homopolymer) is soluble in a limited number of solvents, the use of the polysilane is sometimes limited.

Moreover, in order to expand the scope of the use of the polysilane, it is necessary to impart other functions to the polysilane. However, the polysilane restricts a substituent thereof to extremely few species compared to other carbonaceous compounds. Therefore, it is very difficult to impart other functions to the polysilane or control the physical properties of the polysilane. This difficulty is attributable to the following reasons: most of industrially (or commercially) mass-produced chlorosilane compounds commonly used as a raw material for a polysilane are chlorosilane compounds having an alkyl group or a phenyl group as a substituent, and chlorosilane compounds having other structures are expensive or difficult to synthesize in large quantities.

Further, in order to impart the functionality to the polysilane, it is considered that a chlorosilane compound having a functional substituent (for example, a hydroxyl group, a carboxyl group, and an epoxy group) is synthesized to use for production of a polysilane. However, in such a manner, the functional substituent blocks a synthesis reaction of the polysilane or is denatured and loses functions thereof. Accordingly, it is very difficult to impart the functionality to the polysilane through the use of a monomer having a functional substituent.

Then a process for polymerizing a monomer having a functional substituent that is protected by a protective group has been proposed. For example, Japanese Patent Application Laid-Open No. 39358/1993 (JP-5-39358A, Patent Document 1) discloses a process which comprises eliminating a silyl group from a polysilane having a phenol group protected by the silyl group to give a polysilane having a phenolic hydroxyl group. Specifically, in Example 1, a polysilane having a phenolic hydroxyl group is synthesized by allowing m-bromophenol to react with t-butyldimethylsilyl chloride to give m-(t-butyldimethylsilyloxy)bromobenzene, preparing a Grignard reagent from the resulting m-(t-butyldimethylsilyloxy)bromobenzene and metal magnesium, allowing the reagent to react with tetrachlorosilane to give di[m-(t-butyldimethylsilyloxy)phenyl]dichlorosilane, polymerizing the resulting compound to give a polysilane, and eliminating the protective group from the polysilane. However, a chlorosilane compound having a phenolic hydroxyl group does not exist generally, and even if such a compound is synthesized, it is difficult to polymerize the compound by the process of the document. Additionally, the process of the document not only requires a lot of extremely complicated steps (including protecting a hydroxyl group of a phenol compound, Grignard-reacting the protected phenol compound with tetrachlorosilane, forming a polysilane by polymerization, and eliminating the protective group from the phenol group of the polysilane) but also produces a polysilane having a poor functionality.

Moreover, a method utilizing a terminal group of the polysilane has been known as a method for imparting the functionality to a polysilane. For example, Japanese Patent Application Laid-Open No. 192429/1994 (JP-6-192429A, Patent Document 2) discloses a process which comprises adding reactive substituents to both ends of a polysilane. In the process of the document, a polysilane having reactivity in both ends thereof is obtained by allowing a chloropolysilane having chlorine atoms in both ends thereof to react with $LiAlH_4$ for reduction to give a hydroxypolysilane having hydroxyl groups in both ends thereof, and addition-reacting the resulting polysilane with a reactive compound containing an unsaturated group (e.g., allyl glycidyl ether and trimethoxyvinylsilane) in the presence of a hydrosilylation catalyst. However, the process of the document requires a complicated two-step reaction, and additionally, only two reactive substituents can be introduced to one polysilane molecule at the maximum. Therefore, the molecular design (such as an introduction of reactive substituents in a high density or an extensive change in solubility in a solvent) is restricted.

Incidentally, as a process for producing a polysilane, various processes have been known. For example, International Publication WO98/29476 pamphlet (Patent Document 3) discloses a process for producing a polysilane by acting magnesium or a magnesium alloy on a dihalosilane in the presence of a lithium salt and a metal halide in an aprotic solvent.

[Patent Document 1] JP-5-39358A (Claims and Examples)
[Patent Document 2] JP-6-192429A (Claims and Examples)
[Patent Document 3] WO98/29476 (Claims)

DISCLOSURE OF THE INVENTION

Problems to be Solved by the Invention

It is therefore an object of the present invention to provide a polysilane, which is a polysilane having an imparted excellent functionality (e.g., solubility in a solvent and reactivity), a process for producing the polysilane, and a resin composition containing the polysilane.

It is another object of the present invention to provide a polysilane in which a function to be imparted (e.g., solubility in a solvent and reactivity) can be selected or regulated, a process for producing the polysilane, and a resin composition containing the polysilane.

It is still another object of the present invention to provide a process for producing a polysilane having an excellent functionality imparted thereto easily and efficiently.

Means to Solve the Problems

The inventors of the present invention made intensive studies to achieve the above objects and finally found that an excellent functionality can be easily and efficiently imparted to a polysilane, without complicated steps or special apparatus, by introducing a Si—H group (or a hydrosilyl group) to a main chain of a polysilane, adding (or additionally bonding) a hydrosilylatable compound [for example, a compound having a carbon-carbon unsaturated bond and a functional group (e.g., a hydroxyl group, a carboxyl group, and an epoxy group)] to the hydrogen atom of the Si—H group; and that the function can be imparted to the polysilane as usage (e.g., for a photoelectric material) by certainly and freely controlling a proportion of the hydrosilylatable compound to be added or other factors The present invention was accomplished based on the above findings.

That is, the functional polysilane of the present invention is a compound in which a hydrosilylatable compound is additionally bonded to a polysilane having a structural unit represented by the following formula (1):

[Formula 1]

(1)

wherein $R^1$ represents a hydrogen atom, an organic group, or a silyl group; and "n" denotes an integer of not less than 1.

In the above formula (1), the group R may be a hydrocarbon group (such as an alkyl group, a cycloalkyl group, or an aryl group). Moreover, in the polysilane, the proportion of the structural unit represented by the formula (1) may be about 3 to 90 mol % in terms of silicon atom.

In the functional polysilane of the present invention, the polysilane may comprise the structural unit represented by the formula (1) and other structural units (a structural unit having no silicon-hydrogen bond). For example, the polysilane may comprise a copolysilane having the structural unit represented by the formula (1) and at least one structural unit selected from the group consisting of structural units represented by the following formulae (2) to (4):

[Formula 2]

(2)

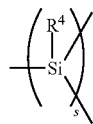
(3)

(4)

wherein $R^2$, $R^3$, and $R^4$ are the same or different and independently represent an organic group or a silyl group; and "r", "s", and "t" independently denote an integer of not less than 0, with the proviso that the total of the numbers "r", "s", and "t" is an integer of not less than 1.

The copolysilane may have a branched structural unit which is at least one selected from the group consisting of the structural unit represented by the formula (3) and the structural unit represented by the formula (4) in view of heat resistance, solubility, or others. In particular, the polysilane may be a copolysilane at least having a structural unit in which the group $R^4$ is a cycloalkyl group or an aryl group in the formula (3). In such a copolysilane having the branched structural unit, the proportion of the structural unit represented by the formula (1) relative to the branched structural unit [the former/the latter (molar ratio)] may be about 90/10 to 3/97 in terms of silicon atom.

The hydrosilylatable compound may be, for example, a compound having at least one unsaturated bond selected from the group consisting of a carbon-carbon unsaturated bond, a carbon-oxygen unsaturated bond, a carbon-nitrogen unsaturated bond, and a carbon-sulfur unsaturated bond. Moreover, in order to impart a further functionality to the polysilane, the hydrosilylatable compound may comprise a compound having a functional group which can be introduced to the polysilane. For example, the hydrosilylatable compound may comprise a compound having a functional group which can be introduced to the polysilane, and the functional group may be at least one selected from the group consisting of an oxygen atom-containing functional group, a nitrogen atom-containing functional group, a sulfur atom-containing functional group, a hydrolytically condensable group, a group containing a carbon-carbon unsaturated bond, and a heterocyclic group.

Representatively, the hydrosilylatable compound may be a compound which has a group containing a carbon-carbon unsaturated bond and at least one functional group selected from the group consisting of a hydroxyl group, a carboxyl group, an acid anhydride group, a carbonyl group, an ester group, an epoxy group, an amino group, a substituted amino group, a carbamoyl group, a nitro group, a cyano group, an oxetanyl group, and a halogen atom.

The functional polysilane of the present invention may be produced by allowing the polysilane (the polysilane having a structural unit represented by the above formula (1)) to react (hydrosilylate) with a hydrosilylatable compound. Such a functional polysilane may be produced by subjecting a halosilane to a reaction in the presence of a magnesium metal component to give a polysilane and allowing the polysilane to react with the hydrosilylatable compound. In the process, the halosilane contains a dihalosilane corresponding to the structural unit represented by the formula (1).

In the above-mentioned production process, the polysilane may be allowed to react (addition-react) with the hydrosilylatable compound in the presence of a hydrosilylation catalyst (for example, a radical generator or a noble metal catalyst).

The present invention also includes a resin composition comprising the functional polysilane. Such a resin composition may be, for example, a resin composition (or curable resin composition) which comprises the functional polysilane having a functional group (e.g., an epoxy group) and a curing agent. In the curable resin composition, the curing agent may suitably be selected depending on the species of the functional group of the functional polysilane. For a functional resin having an epoxy group, the curing agent may be a conventional curing agent for an epoxy resin (for example, an amine-series curing agent and an acid anhydride-series curing agent). Further, as the curing agent, the functional polysilane may be used. That is, the resin composition may comprise (A) a functional polysilane having a functional group and (B) a functional polysilane having a different kind of a functional group from that of the polysilane (A), which acts as a curing agent (or a curing accelerator) for the functional polysilane (A). For example, the resin composition may comprise the functional polysilane having the epoxy group and the functional polysilane having the functional group (e.g., at least one functional group selected from the group consisting of a hydroxyl group, a carboxyl group, an acid anhydride group, and an amino group).

Further, the resin composition may comprise a functional polysilane having a functional group and a resin. For example, such a resin composition may comprise a functional polysilane having a functional group and a thermosetting or photo-curable resin (e.g., an epoxy resin or a polysilane having a terminal silanol group (a polysilane other than the functional polysilane of the present invention)).

EFFECTS OF THE INVENTION

According to the present invention, a silicon-hydrogen bond (Si—H structure) introduced to a main chain of a polysilane contributes to impartment of an excellent functionality to the polysilane. Moreover, according to the present invention, a function to be imparted (such as solubility in a solvent or reactivity) can be selected or adjusted. For example, by a convenient method such as control of the amount or degree (hydrosilylation degree) of the silicon-hydrogen bond to be introduced and the species or amount of functional groups to be introduced by hydrosilylation, the species of a solvent for dissolving the polysilane can be selected or the solubility of the polysilane in the solvent can be controlled. Such a functional polysilane of the present invention can be easily and efficiently produced without complicated steps or special apparatus. The functional polysilane of the present invention is favorably available as, for example, a photoelectric material because of impartment or improvement of various physical properties.

DETAILED DESCRIPTION OF THE INVENTION

The functional polysilane of the present invention (hereinafter, sometimes simply referred to as a polysilane and the term "polysilane" is used as a meaning containing a copolysilane) is a polysilane in which a hydrosilylatable compound is additionally bonded to a specific polysilane having a silicon-hydrogen bond (or a base polysilane).

[Polysilane]

The polysilane has at least a structural unit represented by the following formula (1). Incidentally, the polysilane may be a polysilane having a structural unit represented by the following formula (1) or a copolysilane having a structural unit represented by the following formula (1) and other structural units (for example, any one of the after-mentioned structural units (2) to (4)).

[Formula 3]

(1)

In the formula, $R^1$ represents a hydrogen atom, an organic group, or a silyl group, and "n" denotes an integer of not less than 1.

In the above-mentioned formula (1), the organic group represented by the group R may include, for example, a hydrocarbon group (e.g., an alkyl group, an alkenyl group, a cycloalkyl group, a cycloalkenyl group, an aryl group, and an aralkyl group), an etheric substituent corresponding to each of these hydrocarbon groups (e.g., an alkoxy group, a cycloalkyloxy group, an aryloxy group, and an aralkyloxy group), a hydroxyl group, and an amino group], and a silyl group. Further, these substituents may have one or a plurality of other substituents [for example, the above-mentioned substituent (for example, a hydrocarbon group such as an alkyl group (e.g., a $C_{1-10}$alkyl group, preferably a $C_{1-6}$alkyl group, and more preferably a $C_{1-4}$alkyl group) and an alkoxy group (e.g., a $C_{1-10}$alkoxy group, preferably a $C_{1-6}$alkoxy group, and more preferably a $C_{1-4}$alkoxy group)), and an acyl group (e.g., a $C_{1-10}$alkyl-carbonyl group (such as acetyl group), preferably a $C_{1-6}$alkyl-carbonyl group, and more preferably a $C_{1-4}$alkyl-carbonyl group)].

The alkyl group represented by the group $R^1$ may include, for example, a $C_{1-10}$alkyl group such as methyl, ethyl, propyl, isopropyl, butyl, t-butyl, pentyl, or hexyl (preferably a $C_{1-6}$alkyl group, and more preferably a $C_{1-4}$alkyl group).

The alkoxy group may include, for example, a $C_{1-10}$alkoxy group such as methoxy, ethoxy, propoxy, isopropoxy, butoxy, t-butoxy, or pentyloxy (preferably a $C_{1-6}$alkoxy group, and more preferably a $C_{1-4}$alkoxy group).

Examples of the alkenyl group may include a $C_{2-10}$alkenyl group such as vinyl, allyl, butenyl, or pentenyl (preferably a $C_{2-6}$alkenyl group, and more preferably a $C_{2-4}$alkenyl group).

The cycloalkyl group may include, for example, a $C_{5-10}$cycloalkyl group such as cyclopentyl, cyclohexyl, or methylcyclohexyl (preferably a $C_{5-8}$cycloalkyl group, and more preferably a $C_{5-6}$cycloalkyl group). Examples of the cycloalkyloxy group may include a $C_{5-10}$cycloalkyloxy group such as cyclopentyloxy or cyclohexyloxy (preferably a $C_{5-8}$cycloalkyloxy group, and more preferably a $C_{5-6}$cycloalkyloxy group). The cycloalkenyl group may include, for example, a $C_{5-10}$cycloalkenyl group such as cyclopentenyl or cyclohexenyl (preferably a $C_{5-8}$cycloalkenyl group, and more preferably a $C_{5-6}$cycloalkenyl group).

The aryl group may include, for example, a $C_{6-20}$aryl group such as phenyl, methylphenyl(tolyl), ethylphenyl, dimethylphenyl(xylyl), naphthyl, methylnaphthyl, methoxyphenyl, ethoxyphenyl, or methoxynaphthyl (preferably a $C_{6-15}$aryl group, and more preferably a $C_{6-10}$aryl group). Examples of the aryloxy group may include a $C_{6-20}$aryloxy group such as phenoxy or naphthyloxy (preferably a $C_{6-15}$aryloxy group, and more preferably a $C_{6-10}$aryloxy group). The aralkyl group may include, for example, a $C_{6-20}$aryl-$C_{1-6}$alkyl group such as benzyl, phenethyl, or phenylpropyl (preferably a $C_{6-15}$aryl-$C_{1-4}$alkyl group, and more preferably a $C_{6-10}$aryl-$C_{1-2}$alkyl group). The aralkyloxy group may include, for example, a $C_{6-20}$aryl-$C_{1-16}$alkyloxy group such as benzyloxy, phenethyloxy, or phenylpropyloxy (preferably a $C_{6-15}$aryl-$C_{1-4}$alkyloxy group, and more preferably a $C_{6-10}$aryl-$C_{1-2}$alkyloxy group).

The amino group may include, for example, amino group (—NH$_2$) and a substituted amino group [e.g., an N-mono- or N,N-di-substituted amino group having the above-mentioned alkyl group, cycloalkyl group, aryl group, aralkyl group, acyl group, or the like, as substituent(s)].

Moreover, examples of the silyl group represented by the group $R^1$ may include a $Si_{1-10}$silanyl group such as silyl group, disilanyl group, or trisilanyl group (preferably a $Si_{1-6}$silanyl group) and a substituted silyl group [e.g., a substituted silyl group having the above-mentioned alkyl group, cycloalkyl group, aryl group, aralkyl group, alkoxy group, or the like, as substituent(s)].

The substituent $R^1$ may usually be the hydrocarbon group (a hydrocarbon group which may have a substituent) or the ether group corresponding to the hydrocarbon group [an ether group having a hydrocarbon group (which may have a substituent) bonded or added thereto]. The preferred group $R^1$ includes, for example, a hydrocarbon group such as an alkyl group, a cycloalkyl group, or an aryl group, particularly an alkyl group (e.g., a $C_{1-4}$alkyl group such as methyl group) or an aryl group (e.g., a $C_{6-10}$aryl group such as phenyl group). Incidentally, the species of a plurality of substituent $R^1$s may be the same or different.

Incidentally, in the above formula (1), the number "n" may be not less than 1, for example, about 1 to 1000 (e.g., about 2 to 800), preferably about 3 to 500, and more preferably about 5 to 200.

Moreover, the polysilane may have at least a structural unit represented by the above formula (1). The proportion of the structural unit represented by the formula (1) in terms of silicon atom (or in terms of the number of silicon atoms (Si), more specifically in terms of silicon atom in the whole polysilane; the same applies hereinafter) may be not less than 0.2 mol % (e.g., about 0.5 to 100 mol %), usually about 1 to 99 mol % (e.g., about 1.5 to 97 mol %), preferably about 2 to 95 mol % (e.g., about 3 to 90 mol %), and more preferably about 5 to 80 mol % (e.g., about 7 to 75 mol %).

The polysilane may usually be a copolysilane having the structural unit represented by the formula (1) and other structural units (that is, structural units are different from the structural unit represented by the formula (1)). Such a copolysilane often has more excellent properties (such as more excellent solubility in a solvent) compared with a polysilane having the structural unit represented by the formula (1) alone. The above-mentioned other structural units are not particularly limited to specific ones as long as these units have no hydrogen atom which directly bonds to a silicon atom (or have no Si—H bond, i.e., silicon-hydrogen bond). Such a unit may usually be at least one of structural units represented by the following formulae (2) to (4):

[Formula 4]

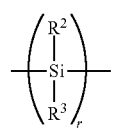

(2)

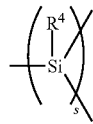

(3)

(4)

wherein, $R^2$, $R^3$, and $R^4$ are the same or different and independently represent an organic group or a silyl group; and "r", "s", and "t" independently denote an integer of not less than 0, and the total of the numbers "r", "s", and "t" is an integer of not less than 1.

In the above-mentioned formula (2) or (3), the groups represented by $R^2$ to $R^4$ may respectively include a group exemplified in the paragraph of the substituent $R^1$ [for example, a hydrocarbon group (such as an alkyl group, an alkenyl group, a cycloalkyl group, a cycloalkenyl group, an aryl group, or an aralkyl group), and an ether group corresponding to the hydrocarbon group (such as an alkoxy group, a cycloalkyloxy group, an aryloxy group, or an aralkyloxy group)].

In the above formula (2) or (3), the preferred groups in these groups $R^2$ to $R^4$ are the same as those in the group $R^1$. For example, the preferred structural unit represented by the formula (2) includes a structural unit in which at least one of $R^2$ and $R^3$ is a cycloalkyl group (e.g., a $C_{5-8}$cycloalkyl group) or an aryl group (e.g., a $C_{6-10}$aryl group). In particular, the structural unit represented by the formula (2) may be a structural unit in which $R^2$ is an aryl group (e.g., a $C_{6-10}$aryl group) and $R^3$ is an alkyl group (e.g., a $C_{1-4}$alkyl group) or an aryl group (e.g., a $C_{6-10}$aryl group).

Moreover, the preferred structural unit represented by the formula (3) includes a structural unit in which $R^4$ is an alkyl group (e.g., a $C_{1-4}$alkyl group), a cycloalkyl group (e.g., a $C_{5-8}$cycloalkyl group), or an aryl group (e.g., a $C_{6-10}$aryl group). In particular, the structural unit represented by the formula (3) may be a structural unit in which $R^4$ is a cycloalkyl group (e.g., a $C_{5-8}$cycloalkyl group) or an aryl group (e.g., a $C_{6-10}$aryl group).

The representative copolysilane includes, for example, (i) a copolysilane having the structural unit represented by the above formula (1) and the structural unit represented by the above formula (2) [for example, an alkyldihalosilane-alkylaryldihalosilane copolymer (e.g., a $C_{1-4}$alkyldihalosilane-$C_{1-4}$alkyl$C_{6-10}$aryldihalosilane copolymer such as a methyldichlorosilane-methylphenyldichlorosilane copolymer), an alkyldihalosilane-diaryldihalosilane copolymer (e.g., a $C_{1-4}$alkyldihalosilane-di$C_{6-10}$aryldihalosilane copolymer such as a methyldichlorosilane-diphenyldichlorosilane copolymer), and an aryldihalosilane-alkylaryldihalosilane copolymer (e.g., a $C_{6-10}$aryldihalosilane-$C_{1-4}$alkyl$C_{6-10}$aryldihalosilane copolymer such as a phenyldichlorosilane-methylphenyldichlorosilane copolymer)], (ii) a copolysilane having the structural unit represented by the above formula (1) and the structural unit represented by the above formula (3) or (4) [for example, an alkyldihalosilane-aryltrihalosilane copolymer (e.g., a $C_{1-4}$alkyldihalosilane-$C_{6-10}$aryltrihalosilane copolymer such as a methyldichlorosilane-phenyltrichlorosilane copolymer), an aryldihalosilane-aryltrihalosilane copolymer (e.g., a $C_{6-10}$aryldihalosilane-$C_{6-10}$aryltrihalosilane copolymer such as a phenyldichlorosilane-phenyltrichlorosilane copolymer), an alkyldihalosilane-tetrahalosilane copolymer (e.g., a $C_{1-4}$alkyldihalosilane-tetrahalosilane copolymer such as a methyldichlorosilane-tetrachlorosilane copolymer), and an aryldihalosilane-tetrahalosilane copolymer (e.g., a $C_{6-10}$aryldihalosilane-tetrahalosilane copolymer such as a phenyldichlorosilane-tetrachlorosilane copolymer)], and (iii) a copolysilane having the structural unit represented by the above formula (1) and a plurality of structural units selected from the group consisting of the structural units represented by the above formulae (2), (3), and (4) [for example, an alkyldihalosilane-alkylaryldihalosilane-aryltrihalosilane copolymer (e.g., a $C_{1-4}$alkyldihalosilane-$C_{1-4}$alkyl$C_{6-10}$aryldihalosilane-$C_{6-10}$aryltrihalosilane copolymer such as a methyldichlorosilane-methylphenyldichlorosilane-phenyltrichlorosilane copolymer)].

In view of heat resistance, polymerization property of polysilane, or others, the preferred copolysilane includes a copolysilane having the structural unit represented by the formula (1) and at least one branched structural unit selected from the group consisting of the structural unit represented by the formula (3) (particularly, a structural unit in which $R^4$ is a cycloalkyl group or an aryl group) and the structural unit represented by the formula (4) [for example, the copolysilane (ii), the alkyldihalosilane-alkylaryldihalosilane-aryltrihalosilane copolymer]. The particularly preferred copolysilane includes a copolysilane having the structural unit represented by the formula (3) in which $R^4$ is a cycloalkyl group or an aryl group (particularly, an aryl group).

Incidentally, in the copolysilane having the above-mentioned branched structural unit, the proportion of the structural unit represented by the formula (1) relative to the branched structural unit [the former/the latter (molar ratio)] may be about 99/1 to 1/99 (e.g., about 95/5 to 2/98), preferably about 90/10 to 3/97, and more preferably about 80/20 to 5/95 in terms of silicon atom.

Moreover, the preferred copolysilane includes a copolysilane at least having a structural unit which has a hydrocarbon ring group directly bonding to a silicon atom (such as a cycloalkyl group or an aryl group), for example, (a) a copolysilane having the structural unit represented by the formula (2) in which at least one of $R^2$ and $R^3$ is a cycloalkyl group or an aryl group, (b) a copolysilane having the structural unit represented by the formula (3) in which $R^4$ is a cycloalkyl group or an aryl group, (c) a copolysilane having the structural unit represented by the formula (4), and (d) a copolysilane having these structural units in combination. Such a structural unit (or a monomer unit) having a hydrocarbon ring group is useful for the production of a copolysilane having a relatively large molecular weight due to a high reactivity of the monomer.

Incidentally, the polysilane may have a straight chain, cyclic, or branched structure having a Si—Si bond. When the polysilane is a copolysilane, the polysilane may usually have a straight chain or branched structure (particularly a branched structure). Moreover, the copolysilane may have at least the structural unit represented by the formula (1). The copolysilane may be either a block copolymer or a random copolymer. Further, the polysilane may have one or more structural units represented by the above formula (1). Furthermore, the copolysilane may have one or more structural units represented by each of the above formulae (2) to (4). Incidentally, in the present invention, a copolymer containing the structural unit represented by the formula (1) is soluble in a wide range of solvents compared with a homopolymer thereof, and a polysilane having a wide field of use can be obtained. That is, the polysilane having a single structure unit and remarkable structural regularity and symmetry due to the species of substituents has a high crystallinity. Accordingly, there is a possibility to limit the range of organic solvents which dissolve the polysilane as a synthesized functional polysilane. Therefore, in order to improve the solubility of the functional polysilane in a wide range of organic solvents, the copolymer is preferably used for the synthesis of the functional polysilane.

The degree of polymerization of the polysilane (particularly, the copolysilane) (for example, the total of the numbers "n", "r", "s", and "t" in the structural units (1) to (4)) may be not less than 2, for example, about 3 to 1000 (e.g., about 3 to 800), preferably about 4 to 500 (e.g., about 5 to 300), and more preferably about 6 to 200.

The weight-average molecular weight of the polysilane (particularly, the copolysilane) may be about 200 to 100000 (e.g., about 300 to 80000), preferably about 400 to 50000 (e.g., about 500 to 30000), and more preferably about 600 to 20000.

[Hydrosilylatable Compound]

The functional polysilane of the present invention is a polysilane in which a hydrosilylatable compound (or a compound which can be reduced by hydrosilylation) is added (or additionally bonded) to the above-mentioned polysilane (more specifically, a hydrogen atom bonding to a silicon atom of the above-mentioned polysilane). That is, the functional polysilane of the present invention is a functional polysilane having the molecular skeleton of the hydrosilylatable compound introduced thereinto through a silicon-hydrogen bond of the above-mentioned polysilane (particularly, the copolysilane) (or by a reaction of the silicon-hydrogen bond and the hydrosilylatable compound).

The hydrosilylatable compound (hereinafter, sometimes simply referred to as a compound) has a hydrosilylatable site (or a reaction site, bonding site) The hydrosilylatable site is not particularly limited to a specific one as long as the site can be reduced by hydrosilylation. The hydrosilylatable site may be a halogen atom or the like and representatively includes an unsaturated bond, e.g., a carbon-carbon unsaturated bond (C=C, C≡C), a hetero atom-containing unsaturated bond [e.g., a carbon-hetero atom unsaturated bond such as a carbon-nitrogen unsaturated bond (C=N, C≡N), a carbon-oxygen unsaturated bond (C=O), or a carbon-sulfur unsaturated bond (C=S)]. The compound may have any one of these sites (e.g., the unsaturated bonds) alone or these sites in combination. Moreover, the compounds may have one or a plurality of these sites. Incidentally, when the compound has a plurality of hydrosilylatable sites, one or a plurality of the sites in the polysilane may be hydrosilylated. In such a case, usually one site may be hydrosilylated and other sites may be left in or on the polysilane without hydrosilylation.

Incidentally, the hydrosilylatable reaction site (or site) is usually contained as a group in the compound. The group (particularly, a group, containing an unsaturated bond or an unsaturated bond-containing group) may be a monovalent group or a polyvalent group (e.g., a divalent group). The group may be located in a main or side chain (or a non-end site) and/or in an end of the compound.

The compound having an unsaturated bond may usually have at least one unsaturated bond mentioned above as the unsaturated bond-containing group in a molecule thereof. The group containing a carbon-carbon unsaturated bond (carbon-carbon unsaturated bond-containing group) may include, for example, a vinylene group (a vinylene group which may have a substituent, such as methylvinylene group, ethylvinylene group, 1,2-dimethylvinylene group, or chlorovinylene group), ethynylene group, a group containing such a group (e.g., a monovalent group). The representative group includes, for example, an alkenyl group (e.g., a $C_{2-6}$alkenyl group which may have a substituent, such as vinyl group, 1-propenyl group, isopropenyl group, allyl group, or 2-butenyl group, preferably a $C_{2-4}$alkenyl group), a cycloalkenyl group (e.g., a $C_{5-10}$alkenyl group such as cyclohexenyl group), an alkynyl group (e.g., a $C_{2-6}$alkynyl group which may have a substituent, such as ethynyl group, 1-propynyl group, propargyl group, or 2-butynyl group, preferably a $C_{2-4}$alkynyl group), and (meth) acryloyl group. The group containing a carbon-oxygen unsaturated bond may include, for example, carbonyl group, a group containing carbonyl group (e.g., a monovalent group). The representative group includes, for example, carbonyl group, isocyanato group (—N=C=O), and cyanato group.

The group containing a carbon-nitrogen unsaturated bond may include, for example, carbonimidoyl group (NH=C=, —C(=NH)—), cyano group, isocyano group, a group containing such a group. The representative group includes, an iminoalkyl group [for example, a imino$C_{1-4}$alkyl group which may have a substituent, such as formamidoyl group (iminomethyl group), 1-iminoethyl group, hydroxyiminomethyl group (such as oxime group), chloroiminomethyl group, iminophenylmethyl group, or amidino group], a nitrogen-containing heterocyclic ring having a carbon-nitrogen double bond (e.g., piridyl group), cyano group, and isocyano group. The group containing a carbon-sulfur unsaturated bond may include, for example, thiocarbonyl group (—CS—, SC=), a group containing thiocarbonyl group (such as thiocyanato group or isothiocyanato group).

The hydrosilylatable compound may have any one of these unsaturated bond-containing groups singly or these groups in combination. Moreover, the compound may have one or a plurality of the same or different unsaturated bond-containing groups. Incidentally, when the compound has a plurality of unsaturated bond-containing groups, the plurality of unsaturated bond-containing groups may be hydrosilylated. As mentioned below, usually, some of the groups may remain functional groups in the hydrosilylated polysilane.

Moreover, the compound may be a compound capable of introducing (or adding) a functional group (or a reactive group) to the polysilane. That is, the compound may be a compound capable of being hydrosilylated and introducing a functional group (such as hydroxyl group or carboxyl group) to the polysilane. Use of such a compound ensures to give a polysilane having a functional group (the functional polysilane). Introduction of such a functional group to the polysilane can further impart functionality or reactivity to the polysilane.

The functional group (functional substituent) may also include a hydrosilylatable group exemplified above, for example, a functional group (a functional group which may be hydrosilylatable) such as an oxygen atom-containing functional group [e.g., a hydroxyl group (such as an alcoholic hydroxyl group or a phenolic hydroxyl group), a carboxyl group, an acid anhydride group, a carbonyl group (or a ketone group, —CO—), an ester group (—COO—), an epoxy group, and an oxetanyl group], a nitrogen atom-containing functional group {e.g., an amino group, a substituted amino group [e.g., an alkylamino group (e.g., a mono- or di$C_{1-4}$alkylamino group such as dimethylamino group), and an imino group], a carbamoyl group (NH$_2$CO—), a nitro group, and a cyano group}, a sulfur atom-containing functional group (such as a mercapto group or a sulfo group), a hydrolytically condensable group [e.g., an alkoxysilyl group (e.g., a tri$C_{1-4}$alkoxysilyl group such as trimethoxysilyl group)], a group containing a carbon-carbon unsaturated bond (e.g., the above-mentioned unsaturated bond-containing group such as a vinylene group, an alkenyl group, or a (meth)acryloyl group), a heterocyclic group [e.g., a heterocyclic group having nitrogen atom, oxygen atom, and/or sulfur atom as a hetero atom (e.g., piridyl group, piperidyl group, piperazinyl group, imidazolyl group, morpholinyl group, furyl group, pyranyl group, and thienyl group)], or a halogen atom (such as chlorine atom, bromine atom, or iodine atom). Incidentally these functional groups may form a salt (for example, a metal salt such as a sodium salt). The above-mentioned polysilane (or the compound) may have one or more of these functional groups (or active groups).

In these functional groups, the particularly preferred group includes a hydroxyl group, a carboxyl group, an acid anhydride group, a carbonyl group, an ester group, an epoxy group, an amino group, a substituted amino group (an N-substituted amino group), a carbamoyl group (or an amide group, or a carbamoyl group which may have a substituent), a nitro group, a cyano group, and a halogen atom.

Incidentally, as long as the functional group can be introduced to the copolysilane, the functional group may be contained in the compound or formed by hydrosilylation. The following mode may be exemplified as the latter mode: when the group containing a hydrosilylatable unsaturated bond contains a carbon-carbon triple bond (such as an alkynylene group), the triple bond-containing group is reduced with hydrosilylation to introduce a carbon-carbon double bond to the copolysilane.

The representative compound for introducing the functional group may include (i) a compound which has a group containing a hydrosilylatable unsaturated bond (e.g., a group containing a carbon-carbon unsaturated bond, such as an alkenyl group) and the above-mentioned functional group which may be hydrosilylable (e.g., a hydroxyl group, a carboxyl group, an amino group, an epoxy group, a carbonyl group, and a cyano group), (ii) a compound having a unsaturated bond-containing group which is hydrosilylatable and forms the functional group after hydrosilylation (or a group changed into the functional group) (e.g., an alkynyl group), and others. The compound capable of introducing the functional group may be usually the above-mentioned compound (i).

Incidentally, in the compound (i), when both of the unsaturated bond-containing group and the functional group are hydrosilylatable, one of these groups (or a group having a higher reactivity than another group) is hydrosilylated, and the other group remains as it is in the copolysilane. For example, when a compound having a carbon-carbon unsaturated bond and a functional group other than the carbon-carbon unsaturated bond (e.g., a carbonyl group, an ester group, a cyano group, an amino group, and a nitro group) is used as the above-mentioned compound, the carbon-carbon unsaturated bond is often hydrosilylated while the functional group often remains as it is without hydrosilylation. As a result, the functional group is introduced to the polysilane.

The representative hydrosilylatable compound includes, for example, a compound having a carbon-carbon unsaturated bond, a compound having a carbon-oxygen unsaturated bond [e.g., an aldehyde (e.g., an alkanal such as acetaldehyde), a ketone (e.g., an alkanone such as acetone, and a cycloalkanone such as cyclohexanone), and an isocyanate], a compound having a carbon-nitrogen unsaturated bond [e.g., an imine (e.g., an N-alkylimine, an N-acylimine, and a salt thereof), a carbodiimide, and a nitrogen-containing heterocyclic compound (e.g., a nitrogen-containing heterocyclic compound such as pyridine or carbazole)], and a compound having a carbon-sulfur unsaturated bond (such as a thioisocyanate or an isothiocyanate).

The compound having a carbon-carbon unsaturated bond may include, for example, an alkene [e.g., a chain alkene (e.g., a $C_{2-10}$alkene such as ethylene, propylene, 1-butene, or isobutene) and a cyclic alkene (e.g., a $C_{5-10}$cycloalkene such as cyclohexene)], an alkyne (e.g., a $C_{2-10}$alkyne such as acetylene or methylacetylene), an alkenyl ether (e.g., an alkyl vinyl ether such as methyl vinyl ether), a styrene compound (such as styrene, α-methylstyrene, or vinyltoluene), and a compound having a carbon-carbon unsaturated bond and a functional group.

The compound having a carbon-carbon unsaturated bond and a functional group (a functional group which may be hydrosilylatable) may include a compound which corresponds to the compound having a carbon-carbon unsaturated bond (e.g., an alkene) and has a functional group, for example, a compound having a plurality of carbon-carbon unsaturated bonds [e.g., an alkadiene (e.g., a $C_{4-10}$alkadiene such as butadiene, isoprene, or 1,5-pentadiene)], a compound having a carbon-carbon unsaturated bond and a hydroxyl group {e.g., an unsaturated hydrocarbon having a hydroxyl group [e.g., an alkenol (e.g., a $C_{3-6}$alkenol such as allyl alcohol, β-methallyl alcohol, 2-buten-1-ol, or 3-buten-2-ol), an alkynol (e.g., a $C_{3-6}$alkynol such as propargyl alcohol or 3-hydroxy-3-methyl-1-penthyne), an alkenyl phenol (e.g., a $C_{2-10}$alkenyl phenol such as vinyl phenol or allyl phenol], a (meth)acrylic compound having a hydroxyl group [e.g., a hydroxy$C_{2-6}$alkyl(meth)acrylate) such as hydroxyalkyl (meth)acrylate (e.g., 2-hydroxyethyl(meth)acrylate, 2-hydroxypropyl(meth)acrylate, or 4-hydroxybutyl (meth)acrylate, and a polyalkylene glycol mono(meth)acrylate (e.g., a poly$C_{2-6}$alkylene glycol mono(meth)acrylate such as diethylene glycol mono(meth)acrylate)], and an alkenyl ether having a hydroxyl group [e.g., a vinyl ether having a hydroxyl group (e.g., a hydroxy$C_{2-6}$alkyl vinyl ether such as 2-hydroxyethyl vinyl ether or 4-hydroxybutyl vinyl ether), and an allyl ether having a hydroxyl group (e.g., a hydroxy$C_{2-6}$alkyl allyl ether such as 2-hydroxyethyl allyl ether or 4-hydroxybutyl allyl ether)]}, a compound having a carbon-carbon unsaturated bond and a carboxyl group or an acid anhydride group [e.g., an alkenecarboxylic acid (e.g., a $C_{3-6}$alkenecarboxylic acid such as (meth)acrylic acid, crotonic acid, or 3-butenoic acid), an alkenedicarboxylic acid (e.g., a $C_{4-8}$alkenedicarboxylic acid or an anhydride thereof such as itaconic acid, maleic acid, maleic anhydride, or fumaric acid), and vinylbenzoic acid], a compound having a carbon-carbon unsaturated bond and a carbonyl group [e.g., an alkyl alkenyl ketone (e.g., a $C_{1-4}$alkyl-$C_{2-6}$alkenyl ketone such as methyl vinyl ketone)], a compound having a carbon-carbon unsaturated bond and an ester group {e.g., an ester of (meth)acrylic acid [e.g., an alkyl (meth)acrylate (e.g., a $C_{1-6}$alkyl(meth)acrylate such as methyl(meth)acrylate, ethyl(meth)acrylate, or butyl (meth)acrylate; and a ($C_{2-4}$acylacetyloxy) $C_{2-4}$alkyl (meth)acrylate such as 2-(acetoacetoxy)ethyl (meth)acrylate)], and a vinyl ester of a carboxylic acid (e.g., a vinyl $C_{2-6}$alkanecarboxylate such as vinyl acetate or vinyl propionate, and vinyl benzoate)}, a compound having a carbon-carbon unsaturated bond and an epoxy group [e.g., an alkenyl glycidyl ether (e.g., a $C_{3-6}$alkenyl-glycidyl ether such as allyl glycidyl ether), and a glycidyl ether such as glycidyl(meth)acrylate], a compound having a carbon-carbon unsaturated bond and an oxetanyl group [e.g., a (meth)acrylic compound having an oxetanyl group, such as 3-ethyl-3-(meth)acryloyloxymethyloxetane], a compound having a carbon-carbon unsaturated bond and an amino group or a substituted amino group [e.g., an alkenylamine (e.g., a $C_{2-6}$alkenylamine such as allylamine), an aminoalkyl (meth)acrylate (e.g., an N-mono- or di$C_{1-4}$alkylamino$C_{1-4}$alkyl(meth)acrylate such as N,N-dimethylaminoethyl(meth)acrylate, N,N-diethylaminoethyl(meth)acrylate, or N,N-dimethylamino(meth)acrylate), and a mono- or diaminostyrene], a compound having a carbon-carbon unsaturated bond and a carbamoyl group (or an amide group) (e.g., (meth)acrylamide; an N-mono- or di$C_{1-4}$alkyl (meth)acrylamide such as N-isopropyl(meth)acrylamide, N,N-dimethyl(meth)acrylamide, or N,N-diethyl (meth)acrylamide; and an N-mono- or di$C_{1-4}$alkyl-amino$C_{1-4}$alkyl(meth)acrylamide such as N,N-dimethylaminopropyl(meth)acrylamide), a compound having a carbon-carbon unsaturated bond and a nitro group (e.g., nitroethylene), a compound having a carbon-carbon unsaturated bond and a cyano group [e.g., a cyanoalkene (such as (meth)acrylonitrile or vinylidene cyanide), and an ester of an α-cyano (meth)acrylic acid (e.g., an alkyl α-cyano(meth)acrylate such as ethyl α-cyano(meth)acrylate)], a compound having a carbon-carbon unsaturated bond and a heterocyclic group (e.g., a nitrogen-containing heterocyclic compound having an alkenyl group, such as vinylpyridine or vinylcarbazole, and a nitrogen-containing heterocyclic compound having a (meth)acryloyl group, such as (meth) acryloylmorpholine), and a compound having a carbon-carbon unsaturated bond and a halogen atom [e.g., a haloalkene (e.g., a halo$C_{2-10}$alkene such as vinyl chloride, allyl chloride, or 3-chloro-1-butene)].

These hydrosilylatable compounds may be added (or additionally bonded) singly or in combination to the polysilane.

In these hydrosilylatable compounds, in order to impart functionality to the polysilane, the compound which is hydrosilylatable and has a functional group is preferred. In particular, in view of the reactivity with the polysilane or the ease of acquisition, the preferred one includes the compound having a carbon-carbon unsaturated bond (e.g., a vinylene group, an ethynylene group, an alkenyl group, and an alkynyl group) and a functional group (e.g., a hydroxyl group (a hydroxyl group which may be a phenolic hydroxyl group), a carboxyl group, an acid anhydride group, a carbonyl group, an ester group, an epoxy group, an amino group, a substituted amino group, a carbamoyl group, a nitro group, a cyano group, and an halogen atom).

As described above, the functional polysilane of the present invention has the hydrosilylatable compound added to the polysilane (specifically, a hydrogen atom bonding to a silicon atom of the polysilane). The proportion (modification proportion) of the compound added to the polysilane may be, for example, not less than 0.1 mol (e.g., about 0.1 to 1 mol) and preferably not less than 0.2 mol (e.g., about 0.3 to 0.99 mol) relative to 1 mol of the hydrogen atom bonding to the silicon atom (or Si—H bond) in the polysilane.

Moreover, use of a compound which can introduce a functional group as the above-mentioned compound in the present invention affords a functional polysilane having a functional group. In the functional polysilane having a functional group, the functional group may include a functional group exemplified above [particularly, a cross-linking functional group (e.g., a hydroxyl group, a carboxyl group, an acid anhydride group, an epoxy group, an amino group, and an oxetanyl group)]. The functional polysilane may have one or more species of functional groups. In the functional polysilane having such a functional group, the proportion of (the total amount of) the functional group may be, for example, about 0.01 to 3 mol, preferably about 0.1 to 2 mol, and more preferably about 0.3 to 1.5 mol (e.g., about 0.5 to 1 mol) relative to 1 mol of the hydrogen atom bonding to the silicon atom (or Si—H bond) in the polysilane.

Incidentally, the ends of the polysilane (or the functional polysilane) are not particularly limited to specific ones. The end may be a group derived from a raw material (e.g., a halogen atom such as chlorine atom) or a moiety obtained by decomposition (such as hydrolysis) of a group derived from a raw material [e.g., a hydroxyl group or a silanol group (—SiOH)] and, if necessary, may be capped by a method described in Japanese Patent Application Laid-Open No. 82325/2003 (JP-2003-82325A). The end of the polysilane is usually a group derived from a raw material (particularly, chlorine atom) or a silanol group (particularly, silanol group). In particular, silanol group(s) in end(s) of the polysilane sometimes further enhances functionality of the polysilane together with a functional group introduced by the compound. For example, a functional polysilane having the silanol group as an end group and a reactive group to the silanol group as the functional group (e.g., a carboxyl group, an acid anhydride group, an epoxy group, particularly an epoxy group) tends to undergo an intermolecular and/or intermolecular crosslinking reaction, which remarkably improves hardenability (or crosslinking property, crosslinking reactivity). Incidentally, the end group may be silanolized by adding water (if necessary with stirring) to the polysilane when the synthesis of the polysilane is completed.

[Process for Producing Functional Polysilane]

The functional polysilane of the present invention is obtained by additionally bonding the polysilane (a polysilane having the structural unit represented by the above formula (1)) to the hydrosilylatable compound. That is, the functional polysilane of the present invention may be produced by a reaction (a hydrosilylation reaction) of a hydrogen atom bonding to a silicon atom of the polysilane (or a hydrosilyl group) with the hydrosilylatable compound.

(Process for Producing Polysilane)

The polysilane may be prepared by using or modifying various production processes of the polysilane. That is, the polysilane may be prepared by using a monomer corresponding to the structural unit represented by the above formula (1) (such as an alkyldihalosilane or an aryldihalosilane) as some or all of monomer components (e.g. halosilanes) for the production of a polysilane in known production processes.

A process comprising reductively coupling a dialkyldihalosilane or a dihalotetraalkyldisilane with the use of an alkali metal (such as metal sodium) at a temperature of not lower than 100° C. in a toluene solvent with stirring vigorously [J. Am. Chem. Soc., 103 (1981) 7352] has been known as the representative synthesis process of the polysilane. However, since this process requires heating and vigorous stirring or dispersion of the alkali metal, which ignites in the air, there is concern that the production has safety in an industrial scale. In addition, the obtained polysilane often shows a multimodal molecular weight distribution and has a low quality.

In addition to this process, for example, the following production processes of the polysilane have been known: (a) a process for an anionic polymerization of a disilene masked with biphenyl or the like (Japanese Patent Application Laid-Open No. 23063/1989 (JP-1-23063A)), (b) a process for a ring-opening polymerization of a cyclic silane (Japanese Patent Application Laid-Open No. 170913/1993 (JP-5-170913A)), (c) a process for a dehydrogenation condensation polymerization of a hydrosilane with the use of a transition metal complex catalyst (Japanese Patent No. 17753/1995 (JP-7-17753B)), and (d) a process for producing a polysilane by an electrode reduction of a dihalosilane at a temperature of not higher than a room temperature (Japanese Patent Application Laid-Open No. 309953/1995 (JP-7-309953A)). However, the anionic polymerization (a) and the ring-opening polymerization (b) are attended with complicated operations such as a synthesis of a complicated monomer. Accordingly, not only the total yield obtained from a raw material of the monomer is low but also the process has a problem of safety because the process requires an alkyl lithium reagent for polymerization. Moreover, in the condensation polymerization (c), due to the reaction mechanism there are still many aspects left to be improved, for example, the molecular weight and the structure of the obtained polysilane (e.g., a crosslinked structure formed by the reaction). On the other hand, the electrode reduction (d) is a superior technique since the process provides a polysilane having a high molecular weight and an excellent quality safely and in a high yield. However, the electrode reduction (d) requires an electrolytic bath, which is a special reaction vessel. Therefore, the electrode reduction (d) is suited to the production of a polysilane for a high-value added application but is not suited to the production of a polysilane for a not very high-value added application.

In view of the above, the preferred process for applying to the production process comprising the polysilane includes a process for a dehalogenation condensation polymerization a halosilane with the use of magnesium as a reducing agent ("magnesium reduction method", e.g., a method described in WO98/29476 publication or Japanese Patent Application Laid-Open No. 277507/2003 (JP-2003-277507A)). The magnesium reduction method (particularly, a method described in JP-2003-277507A) has excellent characteristics as follows: (1) since a stable and inexpensive raw material is used for synthesis by using a general-purpose chemical synthesis apparatus, the method is advantageous with respect to the safety and to the cost, (2) an impurity, which spoils the application of the polysilane for a photoelectric material, (such as sodium or impurities insoluble in an organic solvent) is not present, (3) a polysilane having a narrow distribution of molecular weight and a high solubility in an organic solvent and an improved transparency is obtained, and (4) the yield is high.

That is, the copolysilane can be easily and efficiently produced by a reaction of a halosilane (a halosilane compound) containing a dihalosilane corresponding to the structural unit represented by the formula (1) in the presence of a magnesium metal component without using any special apparatus.

(Halosilane)

The dihalosilane corresponding to the structural unit represented by the formula (1) may include a dihalosilane represented by the following formula (1A):

[Formula 5]

(1A)

wherein each of $X^1$ and $X^2$ represents a halogen atom, and $R^1$ and "n" have the same meanings as defined above.

In the formula (1A), the halogen atom represented by each of $X^1$ and $X^2$ may include fluorine atom, chlorine atom, bromine atom, and iodine atom and preferably includes chlorine atom or bromine atom (particularly chlorine atom). Incidentally, $X^1$ and $X^2$ may be the same or different halogen atoms. Incidentally, in the above-mentioned formula (1A), the number "n" may be not less than 1 as described above. That is, the dihalosilane may be a dihalosilane (n=1) (a monodihalosilane, a monomer) or a polymer (n is more than 1, for example, about 2 to 1000) (a polydihalosilane). Incidentally, use of the polydihalosilane tends to produce a polysilane in the form of a block copolymer.

The representative examples of the dihalosilane represented by the formula (1A) include an alkyldihalosilane (e.g., a $C_{1-4}$alkyldihalosilane such as methyldichlorosilane or ethyldichlorosilane and a polymer thereof), an aryldihalosilane (e.g., a $C_{6-10}$aryldihalosilane such as phenyldichlorosilane, tolyldichlorosilane, xylyldichlorosilane, naphthyldichlorosilane, or methoxyphenyldichlorosilane and a polymer thereof), and others.

Moreover, as described above, the polysilane may usually have a structural unit different from the structural unit represented by the formula (1). When the different structural unit is any one of structural units represented by the above formulae (2) to (4), a halosilane corresponding to each of these structural units may include a halosilane represented by each of the following formulae (2A) to (4A). That is, the halosilane may comprise the dihalosilane represented by the formula (1A) and at least one of halosilanes (di- to tetrahalosilanes) represented by the following formulae (2A) to (4A):

[Formula 6]

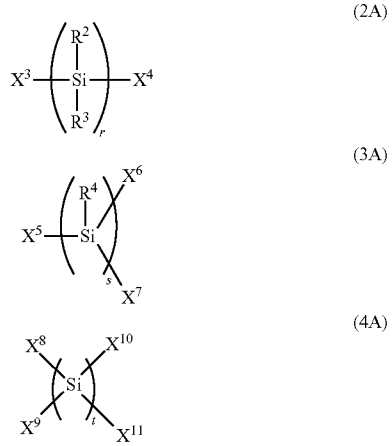

wherein $X^3$ to $X^{11}$ independently represent a halogen atom, $R^2$ to $R^4$, "r", "s", and "t" have the same meanings as defined above.

In the formulae (2A) to (4A), the halogen atoms represented by $X^3$ to $X^{11}$ may include the same atoms as described above. The preferred one includes chlorine atom and bromine atom (particularly, chlorine atom). These atoms may be the same or different halogen atoms. Moreover, in the formulae (2A) to (4A), each of "r", "s", and "t" may be not less than 1 as described above. Each halosilane may be a monomer (r=s=t=1) or a polymer ("r", "s", and "t" is not less than 2). For example, in a dihalosilane represented by the formula (2A), "r" may be about 1 to 1000, preferably about 1 to 500, and more preferably about 1 to 100 (e.g., about 1 to 10). The use of a polymer in which the number "r" is large tends to produce a block copolymer. The use of a monomer or a polymer in which the number "r" is small tends to produce a random copolymer. In view of copolymer production efficiency, the monomer or the polymer having a small number "r" (for example, a halosilane having the number "r" of about 1 to 2) may be preferably used. Incidentally, the trihalosilane and the tetrahalosilane are often employed in the form of a monomer (s=t=1).

The representative examples of the halosilanes represented by the above formulae (2A) to (4A) include a dihalosilane represented by the formula (2A) [e.g., a dialkyldihalosilane (e.g., a di$C_{1-4}$alkyldihalosilane such as dimethyldichlorosilane and a polymer thereof), an alkyl-aryldihalosilane (e.g., a $C_{1-4}$alkyl-$C_{6-10}$aryldihalosilane such as methylphenyldichlorosilane and a polymer thereof), an alkyl-cycloalkyldihalosilane (e.g., a $C_{1-4}$alkyl-$C_{5-10}$cycloalkyldihalosilane such as methylcyclohexyldichlorosilane and a polymer thereof), and a diaryldihalosilane (e.g., a di$C_{6-10}$aryldihalosilane such as diphenyldihalosilane, ditolyldihalosilane, dixylyldihalosilane, phenyltolyldihalosilane, or dimethoxyphenyldihalosilane and a polymer thereof)], a trihalosilane represented by the formula (3A) [e.g., an alkyltrihalosilane (e.g., a $C_{1-4}$alkyltrihalosilane such as methyltrichlorosilane), a cycloalkyltrihalosilane (e.g., a $C_{5-10}$cycloalkyltrihalosilane such as cyclohexyltrichlorosilane), and an aryltrihalosilane (e.g., a $C_{6-10}$aryltrihalosilane such as phenyltrichlorosilane and a polymer thereof)], a tetrahalosilane represented by the formula (4A) (e.g., a tetrahalosilane such as tetrachlorosilane), and others.

Moreover, for capping the end(s) of the copolysilane, if necessary the halosilane may further comprise a monohalosilane [e.g., a trialkylhalosilane (e.g., a tri$C_{1-4}$alkylhalosilane such as trimethylchlorosilane) and a triarylhalosilane (e.g., a tri$C_{6-10}$arylhalosilane such as triphenylchlorosilane)].

Incidentally, in a combination of the dihalosilane represented by the formula (1A) and at least one of the halosilanes represented by the formulae (2A) to (4A), the proportion of these halosilanes may suitably be selected depending on the degree of copolymerization. The proportion of the dihalosilane represented by the formula (1A), usually corresponding to that of the structural unit represented by the formula (1), may be selected from the range of, for example, not less than 1 mol % (e.g., about 3 to 100 mol %) and may be about 5 to 99 mol % (e.g., about 10 to 97 mol %), preferably about 15 to 95 mol % (e.g., about 25 to 90 mol %), and more preferably about 30 to 80 mol % (e.g., about 35 to 75 mol %) of the total halosilane in terms of silicon atom (or in terms of the number of silicon atoms (Si)).

Incidentally, it is preferable that the halosilane have a high purity as far as possible. For example, a liquid halosilane is preferably used after drying with a drying agent such as calcium hydroxide and distillation. A solid halosilane is preferably used after purification such as recrystallization.

Incidentally, the reaction of the halosilane is usually carried out in the presence of a solvent inactive to the reaction. An aprotic solvent (an inactive solvent) can be widely used as the solvent. For example, the aprotic solvent may include an ether (e.g., a cyclic $C_{4-6}$ether such as 1,4-dioxane, tetrahydrofuran, or tetrahydropyran, and a chain $C_{4-6}$ether such as diethyl ether, diisopropyl ether, 1,2-dimethoxyethane, or bis(2-methoxyethyl)ether), a carbonate (such as ethylene carbonate or propylene carbonate), a nitrile (such as a cetonitrile or benzonitrile), an amide (such as dimethylformamide or dimethylacetamide), a sulfoxide (such as dimethyl sulfoxide), a halogen-containing compound (e.g., a halogenated hydrocarbon such as ethylene chloride, chloroform, bromoform, chlorobenzene, or bromobenzene), an aromatic hydrocarbon (such as benzene, toluene, or xylene), and an aliphatic hydrocarbon (e.g., a chain or cyclic hydrocarbon such as hexane, cyclohexane, octane, or cyclooctane). These solvents may be used as a mixed solvent. The preferred solvent includes a polar solvent alone (such as tetrahydrofuran or 1,2-dimethoxyethane), a mixture of two or more polar solvents, a mixture of a polar solvent and a nonpolar solvent, or others. In the use of the mixture of the polar solvent and the nonpolar solvent, the proportion of the polar solvent relative to the nonpolar solvent [the former/the latter (weight ratio)] is about 1/0.01 to 1/20.

The concentration of the halosilane in the solvent (reaction solution) is usually not higher than 20 mol/L (e.g., about 0.05 to 20 mol/L), preferably not higher than 10 mol/L (e.g., about 0.2 to 10 mol/L), and particularly not higher than 5 mol/L (e.g., about 0.3 to 5 mol/L).

(Magnesium Metal Component)

The reaction of the above-mentioned halosilane (a halosilane at least containing a dihalosilane corresponding to the structural unit represented by the formula (1)) can be preferably carried out in the presence of a magnesium metal component. The activity of the magnesium metal component can contribute to an effective production of a polysilane.

The magnesium metal component may at least contain magnesium. The magnesium metal component may be a simple magnesium metal, a magnesium-containing alloy, a mixture containing the magnesium metal or alloy, or others. The species of the magnesium alloy is not particularly limited to a specific one and may include a conventional magnesium alloy, for example, a magnesium alloy containing a component such as aluminum, zinc, or a rare-earth element (such as scandium or yttrium). These magnesium metal components may be used singly or in combination.

The shape (or form) of magnesium metal component is not particularly limited to a specific one as far as the reaction of the halosilane compound is not deteriorated. The shape may include a particulate (such as a powder or a granule), a ribbon shape, a cutting (or shaving) piece, a mass, a bar, a flat plate, and others. In particular, the preferred one includes a shape having a large surface area (such as a powder, a granule, a ribbon shape, or a cutting (or shaving) piece). In a particulate magnesium metal component, the mean particle size thereof is about 1 to 10000 µm, preferably about 10 to 5000 µm, and more preferably about 20 to 1000 µm.

Incidentally, depending on the preservation condition of the magnesium metal component, sometimes a coating (e.g., an oxide coating) is formed on the surface of the metal. Since the coating occasionally have an adverse affect on the reaction, if necessary, the coating may be removed by an appropriate method such as cutting or elution (acid cleaning such as hydrochloric acid cleaning).

The amount of the magnesium metal component is about 1 to 20 equivalents, preferably about 1.1 to 14 equivalents, and more preferably about 1.2 to 10 equivalents (e.g., about 1.2 to 5 equivalents) in terms of magnesium relative to the halogen atom of the halosilane. Moreover, the amount of the magnesium metal component is usually about 1 to 20 mol, preferably about 1.1 to 14 mol, and more preferably about 1.2 to 10 mol (e.g., about 1.2 to 5 mol) in terms of magnesium relative to 1 mol of the halosilane compound.

The magnesium metal component reduces the halosilane to form a polysilane and is oxidized to a halide.

The reaction may be carried out at least in the presence of the above-mentioned magnesium metal component. In order to accelerate the polymerization of the halosilane, the reaction is advantageously carried out in the presence of the magnesium metal component and at least one member selected from the group consisting of a lithium compound and a metal halide (an accelerator or a catalyst), particularly in the presence of the magnesium metal component and both of a lithium compound and a metal halide.

(Lithium Compound)

As the lithium compound, there may be used a lithium halide (such as lithium chloride, lithium bromide, or lithium iodide), an inorganic acid salt (such as lithium nitrate, lithium carbonate, lithium hydrogen carbonate, lithium hydrochloride, lithium sulfate, lithium perchlorate, or lithium phosphate), or others. These lithium compounds may be used singly or in combination. The preferred lithium compound includes a lithium halide (particularly lithium chloride).

The concentration of the lithium compound in the solvent (reaction solution) is usually about 0.05 to 5 mol/L, preferably about 0.1 to 4 mol/L, and particularly about 0.15 to 3 mol/L.

The proportion of the lithium compound relative to 100 parts by weight of the total amount of the halosilane is about 0.1 to 200 parts by weight, preferably about 1 to 150 parts by weight, more preferably about 5 to 100 parts by weight (e.g., about 5 to 75 parts by weight), and usually about 10 to 80 parts by weight.

(Metal Halide Compound)

The metal halide (a metal halide excluding lithium halide) may include a polyvalent metal halide, for example, a halide (such as a chloride, a bromide, or an iodide) of a transition metal (e.g., an element of the Group 3A of the Periodic Table such as samarium, an element of the Group 4A of the Periodic Table such as titanium, an element of the Group 5A of the Periodic Table such as vanadium, an element of the Group 8 of the Periodic Table such as iron, nickel, cobalt, or palladium, an element of the Group 1B of the Periodic Table such as copper, and an element of the Group 2B of the Periodic Table such as zinc), an element of the Group 3B of the Periodic Table (such as aluminum), or an element of the Group 4B of the Periodic Table (such as tin). The valence of the metal constituting the metal halide is not particularly limited to a specific one. The valence is preferably 2 to 4 and particularly 2 or 3. These metal halides may be used singly or in combination.

The metal halide preferably includes a chloride or bromide of at least one metal selected from iron, aluminum, zinc, copper, tin, nickel, cobalt, vanadium, titanium, palladium, samarium, and the like.

Such a metal halide includes, for example, a chloride (e.g., an iron chloride such as $FeCl_2$ or $FeCl_3$; $AlCl_3$, $ZnCl_2$, $SnCl_2$, $CoCl_2$, $VCl_2$, $TiCl_4$, $PdCl_2$, and $SmCl_2$), a bromide (e.g., an iron bromide such as $FeBr_2$ or $FeBr_3$), and an iodide (e.g., $SmI_2$). In these metal halides, the chloride (e.g., an iron chloride such as iron chloride (II) or iron chloride (III), and zinc chloride) and the bromide are preferred. The iron chloride and/or the zinc chloride are usually employed.

The concentration of the metal halide in the solvent is about 0.001 to 6 mol/L, preferably about 0.005 to 4 mol/L, and more preferably about 0.01 to 3 mol/L.

The proportion of the metal halide relative to 100 parts by weight of the total amount of the halosilane compound is about 0.1 to 50 parts by weight, preferably about 1 to 30 parts by weight, and more preferably about 2 to 20 parts by weight.

(Reaction Process)

The reaction of the halosilane may be conducted, for example, by putting the halosilane, the magnesium metal component, and the solvent, and if necessary, the lithium compound and/or the metal halide, in a hermetic reaction vessel and preferably, stirring these components mechanically or magnetically. A plurality of halosilanes may be previously mixed and used as the raw material. Alternatively, a plurality of the halosilanes may be added simultaneously, intermittently, or sequentially. (For example, the reaction is allowed to proceed by adding a first halosilane component to a reaction system to produce a polysilane or an oligosilane, and then a second halosilane component is added to the reaction system for a reaction.) The use of the previously mixed halosilane compounds is favorable for obtaining a random copolymer (a random copolysilane). The addition of the second halosilane component to the reaction system in process of the reaction of the first halosilane component is favorable for obtaining a block copolymer. One component of the dihalosilane represented by the above formula (1A) and at least one selected from di- to tetrahalosilanes represented by the above formulae (2A) to (4A) may be allowed to react to produce a polysilane or an oligosilane, and then the other component may be added to the reaction to give a polysilane.

The shape or structure of the reaction vessel is not particularly limited to a specific one as far as the vessel can be sealed. The inside of the reaction vessel may be a dry atmosphere and is preferably a dried inactive gas (such as a nitrogen gas, a helium gas, or an argon gas) atmosphere, in particular, preferably a deoxidized and dried argon gas atmosphere.

The reaction time depends on the amount of the halosilane, the magnesium metal component, or the catalyst component (the lithium compound, the metal halide), or others. The reaction time is usually not shorter than 5 minutes and about 30 minutes to 100 hours. The molecular weight and structure of the copolysilane can be controlled by adjusting the reaction time or the amount of the magnesium metal component, the species of the catalyst, the amount of the catalyst, or others.

The reaction temperature is usually in the range of from $-20°$ C. to the boiling point of the solvent, and is preferably about 0 to $80°$ C. and more preferably about 20 to $70°$ C. The resulting polymer may be purified by a conventional manner, for example, by reprecipitation using a good solvent and a poor solvent, an extraction, and others.

In the process, a copolysilane having a uniform molecular weight can be produced in a high yield by such a convenient process as stirring of the reaction system at a temperature of around a room temperature. Moreover, since the process uses not an expensive reagent but a commercially available raw material and uses no special apparatus (such as a light irradiator, an ultrasonic apparatus, or an electrode reaction apparatus), the polysilane can be inexpensively produced. Further, a polysilane having a desired structure can be produced by only adjusting the monomer concentration, the species of the catalyst, the amount of the catalyst, and the reaction time.

Incidentally, in order to transform the end of the polysilane into a hydroxyl group efficiently, the reaction solution or a separated polysilane may be brought into contact with water. For example, water or a water-containing agent (e.g., hydrochloric acid) may be added to the reaction system as an agent for stopping the reaction, or water may be added to the reaction solution after the reaction.

(Hydrosilylation Reaction)

The reaction (hydrosilylation reaction) of the polysilane and the hydrosilylatable compound may be carried out in the same manner as known hydrosilylation reactions.

In the hydrosilylation reaction, the hydrosilylatable compounds may be used singly or in combination.

In the hydrosilylation reaction, the proportion of the compound may be suitably adjusted depending on a proportion (or degree) of the compound to be added (or additionally bonded). For example, the proportion of the compound relative to 1 mol of the hydrogen atom bonding to the silicon atom (or the Si—H bond) in the polysilane may be about 0.1 to 3 mol, preferably about 0.3 to 2 mol, and more preferably about 0.5 to 1.5 mol.

Incidentally, the polysilane and the hydrosilylatable compound which are subjected to the hydrosilylation reaction are preferably used in a relatively high purity in order to react with each other efficiently. Moreover, when a commercially available compound is used as the compound, the compound may be distilled for purification before use since the compound sometimes contains a polymerization inhibitor.

The hydrosilylation (the reaction of the polysilane and the hydrosilylatable compound) may usually be carried out in the presence of a catalyst (a hydrosilylation catalyst). The catalyst may be selected depending on the species of the hydrosilylatable group in the compound and is not particularly limited to a specific one. For example, a radical generator, a metal catalyst, or the like is available as the catalyst. These catalysts (such as the radical generator or the metal catalyst) may be used singly or in combination.

The radical generator is not particularly limited to a specific one and may include a peroxide {for example, hydrogen peroxide and an organic peroxide [e.g., a diacyl peroxide (such as a lauroyl peroxide, a benzoyl peroxide (benzoyl peroxide, dibenzoyl peroxide), 4-chlorobenzoyl peroxide, or 2,4-dichlorobenzoyl peroxide), a dialkyl peroxide (such as di-t-butyl peroxide, 2,5-di(t-butylperoxy)-2,5-dimethylhexane, 1,1-bis(t-butylperoxy)-3,3,5-trimethylcyclohexane, 2,5-di(t-butylperoxy)-2,5-dimethylhexene-3, 1,3-bis(t-butylperoxyisopropyl)benzene, or dicumyl peroxide), an alkyl peroxide (such as t-butylhydroperoxide, cumene hydroperoxide, 2,5-dimethylhexane-2,5-dihydroperoxide, or diisopropylbenzene hydroperoxide), an alkylidene peroxide (such as ethyl methyl ketone peroxide, cyclohexanone peroxide, or 1,1-bis(t-butylperoxy)-3,3,5-trimethylcyclohexane), an ester of a peracid (such as t-butyl peracetate or t-butyl perpivalate), a ketone peroxide, a peroxycarbonate, and a peroxy ketal]}, an azo compound {for example, 2,2'-azobis(2,4-dimethylvaleronitrile), 2,2'-azobis(2-methylbutyronitrile), azobisisobutyronitrile, 2,2'-azobis(2,4,4-trimethylpentane), and 2,2'-azobis[2-methyl-N-(2-hydroxyethyl)propionamide]}, and others. These radical generators may be used singly or in combination.

The metal catalyst may include, for example, a transition metal catalyst {for example, a noble metal catalyst such as a platinum-series catalyst [e.g., a simple platinum; a halogenated platinic acid (e.g., chloroplatinic acid or a hydrate thereof, such as $H_2PtCl_6$ or $H_2PtCl_6.6H_2O$), a complex of a halogenated platinic acid and a ligand (such as an alcohol, an aldehyde, or a ketone), a platinum-olefin complex (e.g., $Pt(CH_2=CH_2)_2(PPh_3)_2$, where Ph represents a phenyl group, and $Pt(CH_2=CH_2)_2Cl_2$), a platinum-vinylsiloxane complex, a platinum-phosphine complex (such as $Pt(PPh_3)_4$, where Ph represents a phenyl group), a platinum-phosphite complex (such as $Pt[P(OPh)_3]_4$, where Ph represents a phenyl group), and a platinum carbonyl compound (such as $Pt(CO)_2Cl_2)$], a rhodium compound [e.g., a platinum compound such as a rhodium halide (such as $RhCl_3$) or a rhodium-phosphine complex (such as $RhCl(PPh_3)_3$), where Ph represents a phenyl group], a ruthenium-series catalyst [for example, a ruthenium halide (such as $RuCl_3$)], a palladium-series catalyst (e.g., palladium chloride or a hydrate thereof, such as $PdCl_2$ or $PdCl_2.2H_2O$), an iridium compound (such as $IrCl_3$), or a gold compound; an iron compound, a titanium compound (such as $TiCl_4$), a cobalt compound (such as $Co(CO)_8$), a nickel compound (such as $NiCl_2$), and a rhenium compound (such as $ReCl_3$)}, and a non-transition metal catalyst [for example, an aluminum compound (e.g., an aluminum halide such as aluminum chloride)]. The preferred metal catalyst includes a transition metal catalyst (particularly, a noble metal catalyst such as a platinum compound, a palladium compound, or a rhodium compound). These metal catalysts may be used singly or in combination.

In these hydrosilylation catalysts, the radical generator or the transition metal catalyst (particularly, the noble metal catalyst) is preferred. The radical generator is particularly preferred from industrial viewpoint of view since the radical generator allows the reaction to be conducted by a simple apparatus, is a relatively low-cost, and is easily removed after the reaction, and others.

The amount of the catalyst may be small or a catalytic amount. For example, the amount of the catalyst relative to 1 mol of the hydrogen atom bonding to the silicon atom (or the Si—H bond) in the polysilane may be about 0.0001 to 1 mol, preferably about 0.001 to 0.3 mol, and more preferably about 0.005 to 0.1 mol.

The hydrosilylation reaction may be usually conducted in a solvent. An aprotic solvent may be widely used as the solvent. The solvent may include, for example, an ether (a cyclic or chain $C_{4-6}$ether such as 1,4-dioxane, tetrahydrofuran, tetrahydropyran, diethyl ether, diisopropyl ether, 1,2-dimethoxyethane, or bis(2-methoxyethyl)ether), a carbonate (such as propylene carbonate), a nitrile (such as acetonitrile or benzonitrile) an amide (such as dimethylformamide or dimethylacetamide), a sulfoxide (such as dimethyl sulfoxide), a halogen-series solvent (e.g., a halogenated hydrocarbon such as ethylene chloride, chloroform, bromoform, chlorobenzene, or bromobenzene), an aromatic hydrocarbon (such as benzene, toluene, or xylene), and an aliphatic hydrocarbon (a chain or cyclic hydrocarbon such as hexane, cyclohexane, octane, or cyclooctane). The solvent may be a mixed solvent. The preferred solvent includes a polar solvent (such as tetrahydrofuran or 1,2-dimethoxyethane) alone, a mixture of two or more polar solvents, a mixture of a polar solvent and a nonpolar solvent, and others. In the use of the mixture of the polar solvent and the nonpolar solvent, the proportion of the polar solvent relative to the nonpolar solvent [the former/the latter (weight ratio)] may be about 1/0.01 to 1/20. Incidentally, when the polysilane is soluble in the hydrosilylatable compound, the hydrosilylatable compound may be used as a solvent.

Incidentally, the concentration of the polysilane in the solvent (the reaction solution) may be usually about 1 to 60% by weight, preferably about 3 to 40% by weight, and more preferably about 5 to 30% by weight. When the concentration of the polysilane in the solvent (the reaction solution) is too low, there is a possibility that the addition reaction does not proceed at an enough speed and that the amount of the functional polysilane obtained per unit volume is small and the efficiency is low. On the other hand, when the concentration of the polysilane is too high, there is a possibility that the mixing of the reaction solution is not enough due to the higher viscosity of the reaction solution.

Incidentally, when the reaction is conducted in the solvent, the polysilane and the compound as starting materials may be mixed and then added to the solvent or one of these materials may be mixed (where the complete dissolution is not necessarily needed) and then the other may be added thereto.

The shape or structure of the reaction vessel is not particularly limited to a specific one as far as the vessel can be sealed. The inside of the reaction vessel may be usually a dry atmosphere and is preferably a dried inactive gas (such as an argon gas) atmosphere, particularly preferably a deoxidized and dried inactive gas (particularly, an argon gas) atmosphere.

Incidentally, in order to accelerate the hydrosilylation reaction, the reaction may be carried out under a light irradiation (for example, an ultraviolet light irradiation). Moreover, the hydrosilylation reaction may be carried out with stirring mechanically or magnetically.

The reaction time of the hydrosilylation varies depending on the structure of the polysilane, the species of the compound, the species or amount of the catalyst, or the like. The reaction time may be usually not shorter than 5 minutes (e.g., about 10 minutes to 150 hours), preferably about 30 minutes to 100 hours, and more preferably about 2 hours to 48 hours.

The reaction temperature of the hydrosilylation may usually be in the range of from 0° C. to the boiling point of the used solvent and may be, for example, about 20 to 120° C. and preferably about 35 to 90° C.

After the completion of the reaction, as usage, the reaction solution may be used as a coating solution as it is or by adding other materials thereto. Moreover, the reaction product (the functional polysilane) may be separated from unreacted components (or separated for purification). The separation may be carried out by a conventional manner, for example, by distillation (e.g., distillation under a reduced pressure) and drying (e.g., vacuum drying) the reaction solution to remove (or distill off) the solvent and unreacted components (e.g., an excessive amount of the hydrosilylatable compound) from the reaction solution. If necessary, before the separation, an excessive amount of the compound or the catalyst may be removed by a purification step such as extraction or reprecipitation.

[Application of Functional Polysilane]

Since the functional polysilane of the present invention is obtained by using hydrosilylation shifting a hydrogen atom bonding to the silicon atom of a main chain thereof, the functional polysilane further has an excellent functionality depending on the species of the hydrosilylatable compound (and a functional group thereof) or others in addition to the properties of an ordinary polysilane (e.g., high heat resistance, high refractive index, and photosensitivity). Such a functional polysilane is applied to a conventional use of a polysilane and can have the excellent functionality. In addition, the functional polysilane having a functional group introduced thereto can expand the use of a polysilane.

For example, since the functional polysilane of the present invention may have a variety of functional groups (e.g., a hydroxyl group, a carboxyl group, and an ester group) introduced by hydrosilylation, the functional polysilane may have a high solubility in a solvent. In particular, by introduction of a functional group (e.g., a hydrophilic group such as a hydroxyl group or a carboxyl group), a polysilane can have a solubility in a solvent in which an ordinary polysilane is insoluble (or hardly soluble), such as an alcohol or an alkali solution (e.g., an alkali aqueous solution). Therefore, the functional polysilane of the present invention is preferably available as a coating solution (a coating agent or a component of a coating solution) in a wide range of application.

Moreover, in the functional polysilane of the present invention, the functional group (or reactive group, for example, a hydroxyl group, a carboxyl group, an epoxy group, and an amino group) can impart an excellent reactivity (e.g., an intermolecular or intramolecular crosslinking property) to the polysilane as described above depending on the species of the functional group. Therefore, such a polysilane [for example, a functional polysilane having an epoxy group (or having an epoxy group introduced thereto)] can preferably be utilized as a resin or a resin component [such as a thermosetting resin or a photo-curable resin (a photosensitive resin)]. In the use as such a curable resin, a curable composition (a curable resin composition) may be made from the functional polysilane in combination with a curing agent, an initiator, or others, as described below.

Moreover, the functional polysilane of the present invention sometimes has a self-crosslinking property depending on the species of the functional group and may be used as a self-crosslinking resin (a thermosetting resin). For example, a functional polysilane having a functional group [e.g., a hydroxyl group (e.g., a terminal silanol group)] and a group reactive to the functional group [e.g., a group reactive to the hydroxyl group (e.g., an epoxy group)] may be used as a thermosetting resin since the polysilane is capable of crosslinking or bonding in a molecule thereof. A thermosetting resin composition may be made from the functional polysilane as a thermosetting resin as described above, or a coating solution (a thermosetting resin composition) may be prepared by dissolving the functional polysilane in a suitable solvent.

The present invention includes a resin composition comprising the functional polysilane. Such a resin composition may be either (i) a resin composition comprising the functional polysilane as a resin component or (ii) a resin composition comprising the functional polysilane and a resin (a resin other than the functional polysilane).

The resin composition (i) may include a curable resin composition (a thermosetting or photo-curable resin composition) containing the functional polysilane as a curable resin (a thermosetting or photo-curable resin). Such a curable resin composition may include, for example, a resin composition comprising a functional polysilane having a functional group (e.g., the above-mentioned crosslinking functional group such as an epoxy group) and a curing agent.

The curing agent may suitably be selected depending on the species of the functional group. For example, in the use of the functional polysilane having an epoxy group as a curable resin, for example, there may be used, as the curing agent, at least one curing agent selected from an amine-series curing agent [particularly, a primary amine, for example, a chain aliphatic amine (e.g., a chain aliphatic polyamine such as ethylenediamine, hexamethylenediamine, diethylenetriamine, or triethylenetetramine), a cyclic aliphatic amine (e.g., a monocyclic aliphatic polyamine such as menthenediamine, isophoronediamine, bis(4-amino-3-methylcyclohexyl)methane, or 3,9-bis(3-aminopropyl)-2,4,8,10-tetraoxaspiro(5.5) undecane; and a crosslinked cyclic polyamine such as norbornanediamine), an araliphatic polyamine (e.g., xylylenediamine), and an aromatic amine (e.g., m-phenylenediamine and diaminodiphenylmethane)], a polyaminoamide-series curing agent, an acid anhydride-series curing agent (e.g., an aliphatic acid anhydride such as dodecenylsuccinic anhydride or a polyadipic anhydride; an alicyclic anhydride such as tetrahydrophthalic anhydride, methyltetrahydrophthalic anhydride, hexahydrophthalic anhydride, methylhexahydrophthalic anhydride, methylhimic anhydride, or methylcyclohexenedicarboxylic anhydride; and an aromatic anhydride such as phthalic anhydride, trimellitic anhydride, pyromellitic anhydride, or benzophenonetetracarboxylic anhydride), a phenol resin-series curing agent (e.g., a novolak resin such as a phenol novolak resin or a cresol novolak resin), and others.

Incidentally, in the functional polysilanes, a functional polysilane having a functional group may be used as the curing agent. For example, the resin composition (i) may comprise a functional polysilane having an epoxy group (a resin component) and a functional polysilane having a functional group (such as a hydroxyl group, a carboxyl group, an acid anhydride group, or an amino group) (e.g., a functional polysilane having a phenolic hydroxyl group). When the curing agent comprises the functional polysilane, the proportion of the polysilane (silicon atom) in a cured product of the resin composition can be increased easily.

These curing agents may be used singly or in combination.

In the resin composition (i), the proportion of the curing agent (including the functional polysilane as the curing agent) relative to 100 parts by weight of the functional polysilane having a functional group may be about 0.1 to 600 parts by weight, preferably about 1 to 500 parts by weight, and more preferably about 10 to 400 parts by weight. In particular, the proportion of the curing agent relative to 100 parts by weight of the functional polysilane having a functional group may be about 0.1 to 500 parts by weight, preferably about 1 to 400 parts by weight, and more preferably about 10 to 300 parts by weight. Moreover, in the resin composition (i), the proportion of the curing agent (including the functional polysilane as the curing agent) may be adjusted by functional group equivalents of the functional polysilane and a combined resin (or the curing agent). For example, in a combination of a polysilane having an epoxy group and a curing agent reactive to the epoxy group (including the functional polysilane as the curing agent), the proportion of the curing agent relative to the functional polysilane may be controlled, so that the functional group in the curing agent relative to 1 equivalent of the epoxy group in the functional polysilane may be about 0.1 to 4.0 equivalents, preferably about 0.3 to 2.0 equivalents, and more preferably about 0.5 to 1.5 equivalents.

If necessary, the resin composition (i) may further contain a curing accelerator (a curing catalyst). The curing accelerator may include, for example, an amine [e.g., a tertiary amine (such as triethylamine, benzyldimethylamine, triethanolamine, dimethylaminoethanol, tris(dimethylaminomethyl) phenol, or 1,8-diazabicyclo(5.4.0)undecene-1), an imidazole (e.g., an alkylimidazole such as 2-methylimidazole, 2-phenylimidazole, 2-heptadecylimidazole, or 2-ethyl-4-methylimidazole; and an arylimidazole such as 2-phenylimidazole, 2-phenyl-4-methylimidazole, 2-phenyl-4-methyl-5-hydroxymethylimidazole, or 1-benzyl-2-phenylimidazole), and a derivative thereof (e.g., a salt such as a phenol salt, a phenol novolak salt, a carbonate salt, or a formate salt)], an alkali metal or alkaline earth metal alkoxide, a phosphine compound, an amide compound (e.g., a polyamide of dimer acid), a Lewis acid complex compound (e.g., a boron trifluoride ethylamine complex), a sulfur compound [e.g., a polysulfide and a mercaptan compound (a thiol compound)], a boron compound (e.g., phenyldichloroborane), and a condensable organic metal compound (such as an organic titanium compound or an organic aluminum compound).

These curing accelerators may be used singly or in combination.

The proportion (amount) of the curing accelerator relative to 100 parts by weight of the functional polysilane as the curing agent may be, for example, about 0.01 to 30 parts by weight, preferably about 0.05 to 20 parts by weight, and more preferably about 0.1 to 10 parts by weight.

Moreover, since the functional polysilane of the present invention has an excellent functionality, the polysilane can be used in combination with a resin (a resin which is not included in the category of the functional polysilane of the present invention) for improving the functionality of the resin. Therefore, in the present invention, a resin composition (the resin composition (ii) may comprise the polysilane and the resin. Incidentally, in the resin composition (ii), the functional polysilane may be used as a resin component or as an additive (such as a curing agent or a curing accelerator). That is, the polysilane of the present invention may be used in combination with a resin (or used as an additive for a resin).

The species of the resin is not particularly limited to a specific one and may be either a thermoplastic resin or a thermosetting or photo-curable resin. The thermoplastic resin may include, for example, an olefinic resin (e.g., a polyethylene, a polypropylene, a polymethylpentene, and an amorphous polyolefin), a halogen-containing resin (e.g., a polyvinyl chloride and a fluororesin), a styrenic resin (e.g., a polystyrene and an acrylonitrile-styrene resin), an acrylic resin (e.g., a poly(methyl methacrylate)), a polycarbonate-series resin (e.g., a bisphenol-A-based polycarbonate resin), a polyester-series resin (e.g., a polyethylene terephthalate, a polybutylene terephthalate, a polycyclohexanedimethylene terephthalate, a polyethylene naphthalate, a polyarylate, and a liquid crystal polyester), a polyacetal-series resin, a polyamide-series resin (e.g., a polyamide 6, a polyamide 66, a polyamide 46, a polyamide 6T, and a polyamide MXD), a polyphenylene ether-series resin (e.g., a modified polyphenylene ether), a polysulfone-series resin (e.g., a polysulfone and a polyethersulfone), a polyimide-series resin (e.g., a polyetherimide and a polyamideimide), a maleimide-series resin (e.g., a polyaminobismaleimide and a bismaleimidetriazine resin), and a thermoplastic elastomer.

The thermosetting resin (or photo-curable resin) may include a phenol resin, a furan resin, an amino resin (such as a urea resin or a melamine resin), an unsaturated polyester resin, a diallyl phthalate resin, an epoxy resin, a vinyl ester resin, a polyurethane resin, a polyimide resin, a silicon-series resin [for example, a silicone resin, a polysilane (for example, a polysilane different from the functional polysilane, e.g., a chain, cyclic, or branched polysilane such as a polydimethylsilane, a polymethylphenylsilane, a polydiphenylsilane, or a polyphenylsiline)], a photopolymerizable monomer or oligomer (e.g., a (meth)acrylate-series compound such as epoxy (meth)acrylate, a polyurethane(meth)acrylate, or a polyester (meth)acrylate), and others. The thermosetting resin may be an initial condensate.

These resins may be used singly or in combination. Incidentally, in the use of a plurality of resins, these resins may be in the form of a polymer alloy.

In particular, in a combination of the polysilane and the thermosetting resin (e.g., an epoxy resin), it seems that the crosslinking property or hardenability and the properties of the polysilane (such as chemical resistance or a low dielectric constant) are efficiently imparted to the thermosetting resin probably because the polysilane serves as a curing agent or a curing accelerator depending on the species of the functional group. For example, the functional polysilane having a crosslinking functional group as a functional group [for example, a hydroxyl group (particularly, a phenolichydroxyl group), a carboxyl group, an acid anhydride group, and/or an amino group] is preferable as a curing agent (or a curing accelerator or a curing catalyst) for an epoxy compound (or an epoxy resin).

The epoxy-series resin may include a bisphenol-based epoxy resin (e.g., a reaction product (a condensate) of a bisphenol compound (such as 4,4-biphenol, 2,2-biphenol, bisphenol F, bisphenol AD, or bisphenol A) and epichlorohydrin, particularly, a bisphenol A-based epoxy resin), a novolak epoxy resin [e.g., a phenol novolak epoxy resin (e.g., a phenol novolak glycidyl ether) and a cresol novolak epoxy resin (e.g., a cresol novolak glycidyl ether)], an amine-series epoxy resin, and others. These epoxy resins may be used singly or in combination. Incidentally, the resin composition comprising a polysilane (a polysilane having a terminal silanol group) and an epoxy compound may be referred to Japanese Patent Application Laid-Open No. 265064/2000 (JP-2000-265064A). The resin composition may comprise the functional polysilane of the present invention instead of the polysilane described in the document.

Moreover, the above-mentioned functional polysilane and a polysilane (particularly, a polysilane having a terminal silanol group) may preferably be used in combination. In particular, by a combination of a polysilane having a terminal silanol group and a functional polysilane having a functional group reactive to the silanol group (e.g., an epoxy group), a polysilane resin composition having an excellent crosslinking property (thermosetting property) can be obtained.

Thus the resin composition (the resin composition (ii)) may preferably comprise the above-mentioned functional polysilane and a thermosetting resin (e.g., an epoxy compound or a polysilane).

Moreover, the resin includes a photosensitive resin. That is, the resin composition may comprise the functional polysilane and a photosensitive resin. The photosensitive resin may include a positive photosensitive resin such as a novolak resin (e.g., a phenol novolak resin) or a resin having a hydrophilic group protected with an eliminable protective group [e.g., a polyvinylphenol-series resin having a phenolic hydroxyl group protected with an eliminable protective group (e.g., a homopolymer of vinylphenol, or a copolymer of vinylphenol and the above-exemplified copolymerizable monomer), a (meth)acrylic resin containing a hydroxyl group and/or a carboxyl group (e.g., a homo- or copolymer of (meth)acrylate, or a copolymer of (meth)acrylate and the above-exemplified copolymerizable monomer), and a cyclic olefinic resin containing a hydroxyl group and/or a carboxyl group]; and negative photosensitive resin such as a polymerizable oligomer or resin (e.g., epoxy(meth)acrylate, a polyester (meth) acrylate, an unsaturated polyester resin, a polyurethane (meth)acrylate, and a polymerizable polyvinyl alcohol-series polymer), a polyvinylphenol-series resin (e.g., a homopolymer of vinylphenol, or a copolymer of vinylphenol and a copolymerizable monomer other than vinylphenol).

In the resin composition (the resin composition (ii)), the amount to be added of the functional polysilane depends on the species or intended use of the resin and that of the polysilane. The amount of the functional polysilane relative to 100 parts by weight of the resin may generally be, for example, about 1 to 500 parts by weight, preferably about 10 to 400 parts by weight, and more preferably about 30 to 300 parts by weight.

Moreover, in the resin composition (the resin composition (ii)), the proportion of the functional polysilane as a curing agent for an epoxy resin can be controlled depending on the functional group equivalents of the functional polysilane and an epoxy resin to be combined. For example, the proportion of both components may be controlled, so that the functional group in the functional polysilane relative to 1 equivalent of the epoxy group in the epoxy resin may be about 0.1 to 4.0 equivalents, preferably about 0.3 to 2.0 equivalents, and more preferably about 0.5 to 1.5 equivalents.

Incidentally, such a resin composition (ii) (for example, a thermosetting resin composition) may further contain a curing agent or a curing accelerator, if necessary. As described above, the curing agent may suitably be selected depending on the species of the thermosetting resin. For example, when the thermosetting resin is an epoxy resin (epoxy compound), the composition may contain a curing agent exemplified above.

The resin composition of the present invention may contain various additives as usage, for example, a solvent, a filler, a reinforcing agent, a plasticizer, a polymerization initiator, a catalyst, a stabilizer (such as an antioxidant or an ultraviolet absorbing agent), a release agent, an antistatic agent, a coloring agent, a vulcanizing agent, an antifoaming agent, a leveling agent, a dispersing agent, and a flow control agent. These additives may be used singly or in combination. Moreover, the resin composition of the present invention (the resin composition (i) or the resin composition (ii)) may be a coating composition containing a solvent.

The method for adding and mixing the functional polysilane to the resin is not particularly limited to a specific one. A pellet of the resin, the polysilane, and optionally an additive are usually melt-mixed. For example, a premix of a resin pellet and a component such as a stabilizer, a polysilane, and optionally an additive such as a reinforcing agent or a filler may be melt-mixed by a kneading apparatus. The melt-mixed resin composition is usually pelletized and subjected to forming. The kneading apparatus is provided in a batch type and a continuous type. The batch type kneading apparatus may include a mixing roll, a kneader, an intensive mixer, and others. The continuous type kneading apparatus may include a single screw extruder, an intermeshing twin screw extruder, a non-intermeshing twin screw extruder, and others.

The curable resin composition (the thermosetting or the photo-curable resin composition) may be prepared by mixing the functional polysilane and other components (such as a curing agent or a resin) and optionally a solvent. Moreover, the curable composition may be prepared by mixing the polysilane and an initial resin condensate together with various resin additives (such as a curing agent) if necessary. Incidentally, the curable composition may be prepared by mixing the polysilane and the initial resin condensate (or in a dissolver) and if necessary, kneading the mixture and an additive such as a reinforcing agent, and a foundation cloth may be impregnated with the resulting composition, and the composition may be dried and cured.

The molding method of the resin composition depends on the species of the resin and the application. In the case of the thermoplastic resin, the molding method may include an extrusion molding, an injection molding, a blow molding, an oriented-film molding, a compression molding, a calendar molding, an RIM molding, and others. In the case of the thermosetting resin, the molding method may include a compression molding, a transfer molding, a laminate molding, a cast molding, an RIM molding, and others.

INDUSTRIAL APPLICABILITY

The functional polysilane of the present invention has a superior functionality (e.g., solubility in a solvent, compatibility to a resin, and reactivity) to an ordinary polysilane. For example, since the functional polysilane of the present invention has excellent solubility in various solvents by introduction of a functional group thereto, the functional polysilane can be preferably utilized for a coating solution. Such a coating solution (a coating agent) is highly useful as a polysilane for forming a thin film having a high heat resistance. Moreover, since the polysilane having a functional group has an excellent reactivity, the polysilane may be used as a resin or an additive for a resin. Further, such a function to be imparted to the polysilane can be easily and precisely controlled by controlling the species or amount of the functional group, the ratio of introduction, and others. Therefore, according to the present invention, the physical properties (e.g., photoelectric function) of the resulting functional polysilane can be precisely controlled. For example, the physical properties necessary for a photoelectric material application, and the solubility in an organic solvent necessary for the use as a thin film can be easily and precisely controlled.

Therefore, the polysilane of the present invention (and a resin composition thereof) is utilized for various applications, for example, a ceramics precursor, a photoelectric material (e.g., a photoelectric material such as a photo resist or an organic photoreceptor, an optically transmissive material such as a light guide, an optically recording material such as an optical memory, and an electroluminescent device), an optical member (e.g., an optical filter, a mirror, a lens, a shade film, a diffraction grating, a polarizing beam splitter, and a microlens), a flame retardant, a curing agent, and others.

EXAMPLES

The following examples are intended to describe this invention in further detail and should by no means be interpreted as defining the scope of the invention.

Example 1

To a round flask (internal volume: 1000 ml) equipped with a three-way stopcock, 25 g of granular magnesium (particle size: 20 to 1000 μm) and 20 g of lithium chloride as a catalyst were fed, and the internal of the reaction vessel (flask) was dried with heating at 50° C. under a reduced pressure of 1 mmHg (=133 kPa). Thereafter, dry argon gas was introduced into the reaction vessel, 500 ml of tetrahydrofuran (THF) pre-dried with sodium-benzophenone ketyl was added thereto, and the mixture was stirred at 25° C. for about 60 minutes. To the reaction mixture were added 63.5 g (0.3 mol) of phenyltrichlorosilane purified by distillation and 34.5 g (0.3 mol) of methyldichlorosilane purified by distillation by the use of a syringe, and the resulting mixture was stirred at 25° C. for about 24 hours. After completion of the reaction, 1000 ml of 1N (=1 mol/L) hydrochloric acid was put in the reaction mixture, and the reaction mixture was subjected to extraction with 500 ml of toluene. The washing of the toluene layer with 200 ml aliquots of purified water was repeated ten times, and the toluene layer was dried with anhydrous magnesium sulfate, and then toluene was distilled off to give a phenyltrichlorosilane-methyldichlorosilane copolymer (the former/the latter (molar ratio)=1/1) (weight-average molecular weight: 2500).

To a short-neck flask (internal volume: 300 ml), 7.5 g of the resulting phenyltrichlorosilane-methyldichlorosilane copolymer (a copolysilane having a Si—H bond proportion of about 50 mmol) and 30 g of tetrahydrofuran were fed and stirred to prepare a solution. Then to the solution was added 0.41 g of azobisisobutyronitrile (AIBN), and the mixture was stirred at a room temperature for about 30 minutes. Ethyl acrylate (5.0 g (50 mmol)) purified by distillation was dropped into the mixture with heating, and the resulting mixture was stirred at 67° C. for about 24 hours. After completion of the reaction, the reaction mixture was filtered with a filter paper having a thickness of 5 μm. Then, the filtrate was distilled at 70° C. under a reduced pressure to remove the solvent, ethyl acrylate, and a decomposed matter of AIBN. Further, the residue was dried at 70° C. for 24 hours in vacuo to give 12.5 g of a copolysilane having an ethyl carboxylate structure (yield: 100%).

Example 2

In the same manner as Example 1 except for using 3.7 g (50 mmol) of acrylic acid instead of 5.0 g of ethyl acrylate in Example 1, 11.2 g of a copolysilane having a carboxyl group was obtained (yield: 100%).

Example 3

In the same manner as Example 2 except for using 0.061 g of dibenzoyl peroxide instead of 0.41 g of AIBN in Example 2, 11.2 g of a copolysilane having a carboxyl group was obtained (yield: 100%).

Example 4

To a short-neck flask (internal volume: 300 ml), 7.5 g of the phenyltrichlorosilane-methyldichlorosilane copolymer obtained in Example 1 and 30 g of tetrahydrofuran were fed and stirred to prepare a solution. Then to the solution was added 2.5 ml of an isopropanol (IPA) solution containing $H_2PtCl_6.6H_2O$ in a proportion of 0.001 mol/L as a catalyst, and the mixture was stirred at a room temperature for about 30 minutes. Acrylic acid (3.7 g) purified by distillation was dropped into the mixture with heating, and the resulting mixture was stirred at 67° C. for about 24 hours. After completion of the reaction, the reaction mixture was filtered with a filter having a thickness of 5 µm. To the resulting filtrate was added 100 ml of toluene, and the extraction of the mixture with 20 ml aliquots of water was repeated three times. Then, the toluene layer was dehydrated with magnesium sulfate and filtered with a filter having a thickness of 5 µm. The filtrate was distilled at 70° C. under a reduced pressure to remove the solvent and acrylic acid. Further, the residue was dried at 70° C. for 24 hours in vacuo to give 11.2 g of a copolysilane having a carboxyl group (yield: 100%).

Example 5

To a round flask (internal volume: 1000 ml) equipped with a three-way stopcock, 90 g of granular magnesium (particle size: 20 to 1000 µm) and 20 g of lithium chloride as a catalyst were fed, and the internal of the reaction vessel (flask) was dried with heating at 50° C. under a reduced pressure of 1 mmHg (=133 kPa). Thereafter, dry argon gas was introduced into the reaction vessel, 500 ml of tetrahydrofuran (THF) pre-dried with sodium-benzophenone ketyl was added thereto, and the mixture was stirred at 25° C. for about 60 minutes. To the reaction mixture were added 114.7 g (0.6 mol) of methylphenyldichlorosilane purified by distillation and 35.4 g (0.2 mol) of phenyldichlorosilane purified by distillation by the use of a syringe, and the resulting mixture was stirred at 25° C. for about 24 hours. After completion of the reaction, 2000 ml of 1N (=µmol/L) hydrochloric acid was put in the reaction mixture, and the reaction mixture was subjected to extraction with 500 ml of toluene. The washing of the toluene layer with 200 ml aliquots of purified water was repeated ten times, and the toluene layer was dried with anhydrous magnesium sulfate, and then toluene was distilled off to give a methylphenyldichlorosilane-phenyldichlorosilane copolymer (the former/the latter (molar ratio)=3/1) (weight-average molecular weight: 4000).

In the same manner as Example 2 except for using 23.3 g of the obtained methylphenyldichlorosilane-phenyldichlorosilane copolymer instead of 7.5 g of the phenyltrichlorosilane-methyldichlorosilane copolymer in Example 2, 27.0 g of a copolysilane having a carboxyl group was obtained (yield: 100%).

Example 6

To a round flask (internal volume: 1000 ml) equipped with a three-way stopcock, 40 g of granular magnesium (particle size: 20 to 1000 µm) and 20 g of lithium chloride as a catalyst were fed, and the internal of the reaction vessel (flask) was dried with heating at 50° C. under a reduced pressure of 1 mmHg (=133 kPa). Thereafter, dry argon gas was introduced into the reaction vessel, 500 ml of tetrahydrofuran (THF) pre-dried with sodium-benzophenone ketyl was added thereto, and the mixture was stirred at 25° C. for about 60 minutes. To the reaction mixture were added 31.7 g (0.15 mol) of phenyltrichlorosilane purified by distillation and 34.5 g (0.3 mol) of methyldichlorosilane purified by distillation by the use of a syringe, and the resulting mixture was stirred at 25° C. for about 24 hours. After completion of the reaction, 1000 ml of 1N (=1 mol/L) hydrochloric acid was put in the reaction mixture, and the reaction mixture was subjected to extraction with 500 ml of toluene. The washing of the toluene layer with 200 ml aliquots of purified water was repeated ten times, and the toluene layer was dried with anhydrous magnesium sulfate, and then toluene was distilled off to give a phenyltrichlorosilane-methyldichlorosilane copolymer (the former/the latter (molar ratio)=1/2) (weight-average molecular weight: 3500).

In the same manner as Example 2 except for using 4.84 g of the obtained phenyltrichlorosilane-methyldichlorosilane copolymer instead of 7.5 g of the phenyltrichlorosilane-methyldichlorosilane copolymer in Example 2, 8.5 g of a copolysilane having a carboxyl group was obtained (yield: 100%).

Example 7

In the same manner as Example 1 except for using 6.7 g (50 mmol) of 2-allyl phenol instead of 5.0 g of ethyl acrylate in Example 1, 11.7 g of a copolysilane having a hydroxyl group (phenolic hydroxyl group) was obtained (yield: 100%).

Example 8

In the same manner as Example 1 except for using 7.2 g (50 mmol) of glycidyl methacrylate instead of 5.0 g of ethyl acrylate in Example 1, 14.7 g of a copolysilane having a glycidyl group was obtained (yield: 100%).

Example 9

To a short-neck flask (internal volume: 300 ml), 7.5 g of the phenyltrichlorosilane-methyldichlorosilane copolymer obtained in Example 1 and 30 g of cyclohexanone were fed and stirred to prepare a solution. Then to the solution was added 0.41 g of azobisisobutyronitrile (AIBN) and heated. The mixture was stirred at 100° C. for about 12 hours. After completion of the reaction, the reaction mixture was filtered with a filter having a thickness of 5 µm. The resulting filtrate was distilled at 80° C. under a reduced pressure to remove an excess amount of cyclohexanone. Further, the residue was dried at 80° C. for 24 hours in vacuo to give 9.3 g of a copolysilane having cyclohexyloxy group (yield: 75%).

Comparative Example 1

Methylphenyldichlorosilane ($MePhSiCl_2$) was polymerized with the use of magnesium (Mg) to give a polymethylphenylsilane (PMPS, weight-average molecular weight: 20000).

Comparative Example 2

Diphenyldichlorosilane ($Ph_2SiCl_2$) was polymerized with the use of magnesium (Mg) to give a polydiphenylsilane (PDPS, weight-average molecular weight: 900).

Comparative Example 3

Phenyltrichlorosilane ($PhSiCl_3$) was polymerized with the use of magnesium (Mg) to give a polyphenylsiline (PPSi, weight-average molecular weight: 2000).

Comparative Example 4

Phenyltrichlorosilane ($PhSiCl_3$) and methylphenyldichlorosilane ($MePhSiCl_2$) were copolymerized with the use of magnesium (Mg) to give a phenyltrichlorosilane-methylphenyldichlorosilane copolymer (PPSi—PMPS, weight-average molecular weight: 3000, copolymerization ratio: 1/2).

Each of polysilanes obtained in Examples 2 and 7 and Comparative Examples 1 to 4 was mixed to a solvent [each solvent of toluene, propylene glycol monomethyl ether acetate (PGMEA), 2-propanol (IPA), and an ammonia water (an aqueous solution of 28% by weight)] in a proportion of 5% by weight, and the solubility of the polysilane was evaluated on the basis of the following criteria.

"A": The polysilane completely dissolves and the solution is transparent.

"B": The polysilane mostly dissolves and slightly remains unsolved.

"C": The polysilane remains mostly unsolved.

The results are shown in Table 1.

[Table 1]

TABLE 1

|  | Toluene | PGMEA | IPA | Ammonia water |
|---|---|---|---|---|
| Example 2 | B slightly dissolve | A | A | A |
| Example 7 | A | A | A | B slightly dissolve |
| Comparative Example 1 | A | B remaining unsolved | C | C |
| Comparative Example 2 | B slightly dissolve | C | C | C |
| Comparative Example 3 | A | A | C | C |
| Comparative Example 4 | A | A | C | C |

As apparent from Table 1, a polysilane soluble in an alcohol or an alkali aqueous solution was obtained by introducing a functional group to the polysilane.

Each of polysilanes obtained in Example 8 and Comparative Examples 1, 3, and 4 was mixed to propylene glycol monomethyl ether acetate (PGMEA) in a proportion of 5% by weight to prepare a solution. The solution was spin-coated on a glass substrate and heat-treated in the condition of the temperature and time shown in Table 2 to give a thin film. The external appearance of the thin film was observed and evaluated on the basis of the following criteria.

"A": The film has a flat and smooth surface.
"B": The film has a rough surface.
"C": The film has cracks.

Moreover, the obtained thin film was immersed in toluene at 30° C. for 20 minutes, and the degree of curing of the thin film was observed and evaluated on the basis of the following criteria.

"A": The thin film does not dissolve at all.
"B": The thin film slightly dissolves.
"C": The toluene solution is cloudy or the thin film dissolves.

The results are shown in Table 2.

[Table 2]

TABLE 2

|  |  | 160° C., 3 hours | 200° C., 3 hours | 240° C., 3 hours |
|---|---|---|---|---|
| Example 8 | Appearance | A | A | A |
|  | Curing | A | A | A |
| Comparative Example 1 | Appearance | A | C | C |
|  | Curing | C (dissolve) | C (cloudy) | C (cloudy) |
| Comparative Example 3 | Appearance | A | B | B |
|  | Curing | C (dissolve) | C (dissolve) | A |
| Comparative Example 4 | Appearance | A | A | A |
|  | Curing | C (dissolve) | B | A |

As apparent from Table 2, it was revealed that the polysilane having a glycidyl group hardened at a low temperature at which no conventional polysilane hardened. This reason possibly includes a thermal crosslinking reaction between the glycidyl group and the terminal Si—OH group.

As stated above, in the polysilanes obtained in Examples, physical properties or characteristics were easily improved.

Example 10

To propylene glycol monomethyl ether acetate (PGMEA) were mixed 1.69 parts by weight of the copolysilane having a carboxyl group obtained in Example 2 (carboxyl group equivalents=400 g/eq), 0.8 part by weight of an epoxy resin (a bisphenol A-based epoxy resin, manufactured by Asahi Kasei Corporation: AER-260, epoxy equivalents=189 g/eq), and 0.017 part by weight of a catalyst (manufactured by Tokyo Kasei Kogyo Co., Ltd.: 2-methylimidazole; 2-Mz) in a solid content of 35% by weight to prepare a solution. The resulting solution was thoroughly stirred for dissolution and filtered to give a resin composition comprising the functional polysilane and the epoxy resin.

Example 11

In the same manner as Example 10 except for using 1.46 parts by weight of the copolysilane, 0.8 part by weight of a phenol novolak epoxy resin (manufactured by Asahi Kasei Chemicals Corporation: EPN-1138, epoxy equivalents=219 g/eq), and 0.015 part by weight of the catalyst instead of 1.69 parts by weight of the copolysilane, 0.8 part by weight of the bisphenol A-based epoxy resin, and 0.017 part by weight of the catalyst, respectively, a resin composition was obtained.

Example 12

In the same manner as Example 10 except for using 1.78 parts by weight of the copolysilane, 0.8 part by weight of a cresol novolak epoxy resin (manufactured by Asahi Kasei Chemicals Corporation: ECN-1273, epoxy equivalents=179 g/eq), and 0.018 part by weight of the catalyst instead of 1.69 parts by weight of the copolysilane, 0.8 part by weight of the bisphenol A-based epoxy resin, and 0.017 part by weight of the catalyst, respectively, a resin composition was obtained.

Each of these resin compositions obtained in Examples 10 to 12 was coated on a glass substrate under spincoat conditions in which a film having a thickness of 2±0.3 μm was obtained by pre-baking, and pre-baked at 90° C. for 2 minutes to evaporate the solvent (PGMEA). Thereafter, the pre-baked product was post-baked at 180° C. for 3 hours for curing to give a thin film as a cured product of the resin composition comprising the functional polysilane having a functional group and the thermosetting resin. The external appearance of the resulting thin film was observed and evaluated on the basis of the following criteria.

"A": The film has a flat and smooth surface.
"B": The film has a rough surface.
"C": The film has cracks.

Further, each of the thin films obtained in Examples 10 to 12 was rubbed 100 times with a cotton swab soaked in propylene glycol monomethyl ether acetate (PGMEA), and the degree of curing of the thin film was observed and evaluated on the basis of the following criteria.

"A": The thin film has no change in appearance.
"B": The thin film partly has left from the glass plate.
"C": The thin film completely peels off the glass plate.

Further, the refractive index (589 nm) of the obtained thin film was measured by using a reflective film thickness monitor FE-3000 (manufactured by Otsuka Electronics Co., Ltd.). The results are shown in Table 3.

[Table 3]

TABLE 3

| | Epoxy resin | Carboxyl group/ Epoxy group equivalent ratio | Evaluation item (curing condition: 180° C., 3 hours) | |
| --- | --- | --- | --- | --- |
| Example 10 | AER-260 | 1.0/1.0 | Appearance Hardenability Refractive index | A A 1.64 |
| Example 11 | EPN-1138 | 1.0/1.0 | Appearance Hardenability Refractive index | A A 1.63 |
| Example 12 | ECN-1273 | 1.0/1.0 | Appearance Hardenability Refractive index | A A 1.63 |

As apparent from Table 3, it was confirmed that the thin film formed from the copolysilane obtained in Example 2 had an excellent external appearance and hardenability and had a high refractive index.

Example 13

To propylene glycol monomethyl ether acetate (PGMEA) were mixed 2.75 parts by weight of the copolysilane having a glycidyl group obtained in Example 8 as an epoxy resin (epoxy equivalents=570 g/eq), 0.72 part by weight of an epoxy-curing agent (manufactured by New Japan Chemical CO., Ltd.: RIKACID MH-700, acid anhydride group equivalents=166 g/eq), and 0.012 part by weight of a catalyst (manufactured by Tokyo Chemical Industry CO., Ltd.: 2-methylimidazole; 2-Mz) in a solid content of 35% by weight to prepare a solution. The resulting solution was thoroughly stirred for dissolution and filtered to give a resin composition comprising the functional polysilane and the curing agent.

Example 14

In the same manner as Example 13 except for using 0.8 part by weight of the copolysilane, 0.054 part by weight of norbornanediamine (manufactured by Mitsui Chemicals, Inc.: NBDA, amine equivalents=38.5 g/eq), and 0 part by weight of the catalyst instead of 2.75 parts by weight of the copolysilane, 0.8 part by weight of the epoxy-curing agent, and 0.012 part by weight of the catalyst, respectively, a resin composition was obtained.

Example 15

In the same manner as Example 13 except for using 1.11 parts by weight of the copolysilane and 0.8 part by weight of the copolysilane having a hydroxyl group (a phenolic hydroxyl group) obtained in Example 7 (hydroxyl group equivalents=411 g/eq) instead of 2.75 parts by weight of the copolysilane and 0.8 part by weight of the epoxy-curing agent, respectively, a resin composition was obtained.

Each of these resin compositions obtained in Examples 13 to 15 was coated on a glass substrate under spincoat conditions in which a film having a thickness of 2±0.3 μm was obtained by pre-baking, and pre-baked at 90° C. for 2 minutes to evaporate the solvent (PGMEA). Thereafter, the pre-baked product was post-baked at 180° C. for 3 hours for curing to give a thin film as a cured product of the resin composition comprising the functional polysilane having a functional group as an epoxy resin and the epoxy-curing agent. The external appearance of the resulting thin film was observed and evaluated on the basis of the following criteria.

"A": The film has a flat and smooth surface.
"B": The film has a rough surface.
"C": The film has cracks.

Further, each of the thin films obtained in Examples 13 to 15 was rubbed 100 times with a cotton swab soaked in propylene glycol monomethyl ether acetate (PGMEA), and the degree of curing of the thin film was observed and evaluated on the basis of the following criteria.

"A": The thin film has no change in appearance.
"B": The thin film partly has left from the glass plate.
"C": The thin film completely peels off the glass plate.

The results are shown in Table 4.

[Table 4]

TABLE 4

| | Epoxy-curing agent | Mixing equivalent ratio | Evaluation item (curing condition: 180° C., 3 hours) | |
| --- | --- | --- | --- | --- |
| Example 13 | MH-700 | Epoxy group/Acid anhydride group (equivalent ratio) = 1.0/0.9 | Appearance Hardenability | A A |
| Example 14 | NBDA | Epoxy group/Amino group (equivalent ratio) = 1.0/1.0 | Appearance Hardenability | A A |
| Example 15 | Copolysilane obtained in Example 7 | Epoxy group/ Hydroxyl group (equivalent ratio) = 1.0/1.0 | Appearance Hardenability | A A |

As apparent from Table 4, it was confirmed that the thin film formed from the copolysilane obtained in Example 8 had an excellent external appearance and hardenability. In addition, it was confirmed that the thin film formed from the mixture of the copolysilane obtained in Example 8 and the copolysilane obtained in Example 7 had also an excellent external appearance and hardenability.

The invention claimed is:

1. A functional polysilane in which a hydrosilylatable compound is additionally bonded to a polysilane having a structural unit represented by the following formula (1):

[Formula 1]

wherein $R^1$ represents a hydrogen atom, an organic group, or a silyl group; and "n" denotes an integer of not less than 1,
wherein the polysilane comprises a copolysilane having the structural unit represented by the formula (1) and at least one selected from the group consisting of structural units represented by the following formulae (2) to (4):

[Formula 2]

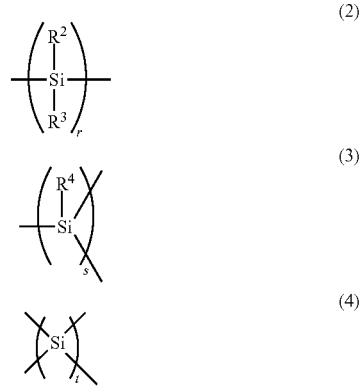

wherein $R^2$, $R^3$ and $R^4$ are the same or different and independently represent an organic group or a silyl group; and "r", "s", and "t" independently denote an integer of not less than 0, with the proviso that the total of the numbers "r", "s", and "t" is an integer of not less than 1,
the copolysilane has a branched structural unit which is at least one selected from the group consisting of the structural unit represented by the formula (3) and the structural unit represented by the formula (4),
the proportion of the structural unit represented by the formula (1) relative to the branched structural unit [the former/the latter (molar ratio)] is 90/10 to 3/97 in terms of silicon atom,
the hydrosilylatable compound has a group containing a carbon-carbon unsaturated bond and at least one functional group selected from the group consisting of a hydroxyl group, a carboxyl group, an acid anhydride group, a carbonyl group, an ester group, an epoxy group, an amino group, a substituted amino group, a carbamoyl group, a nitro group, a cyano group, an oxetanyl group, and a halogen atom.

2. A functional polysilane according to claim 1, wherein, in the formula (1), the group $R^1$ is an alkyl group, a cycloalkyl group, or an aryl group.

3. A functional polysilane according to claim 1, wherein the copolysilane at least has a structural unit in which the group $R^4$ is a cycloalkyl group or an aryl group in the formula (3).

4. A process for producing a functional polysilane according to claim 1 comprising allowing a polysilane having a structural unit represented by the following formula (1):

to react with a hydrosilylatable compound to additionally bond the hydrosilylatable compound to the polysilane, wherein $R^1$ represents a hydrogen atom, an organic group, or a silyl group;
and "n" denotes an integer of not less than 1.

5. A process according to claim 4,
wherein a halosilane containing a dihalosilane corresponding to the structural unit represented by the formula (1) is subjected to a reaction in the presence of a magnesium metal component to give a polysilane, and the resulting polysilane is allowed to react with the hydrosilylatable compound.

6. A process according to claim 4, wherein the polysilane is allowed to react with the hydrosilylatable compound in the presence of a radical generator or a noble metal catalyst.

7. A resin composition comprising a functional polysilane in which a hydrosilylatable compound is additionally bonded to a polysilane having a structural unit represented by the following formula (1):

wherein $R^1$ represents a hydrogen atom, an organic group, or a silyl group; and "n" denotes an integer of not less than 1,
wherein the polysilane comprises a copolysilane having the structural unit represented by the formula (1) and at least one selected from the group consisting of structural units represented by the following formulae (2) to (4):

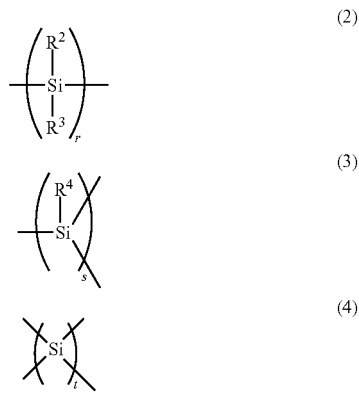

wherein $R^2$, $R^3$ and $R^4$ are the same or different and independently represent an organic group or a silyl group; and "r", "s", and "t" independently denote an integer of not less than 0, with the proviso that the total of the numbers "r", "s", and "t" is an integer of not less than 1,
the copolysilane has a branched structural unit which is at least one selected from the group consisting of the structural unit represented by the formula (3) and the structural unit represented by the formula (4),
the proportion of the structural unit represented by the formula (1) relative to the branched structural unit [the former/the latter (molar ratio)] is 90/10 to 3/97 in terms of silicon atom, and the hydrosilylatable compound has a group containing a carbon-carbon unsaturated bond and at least one functional group selected from the group consisting of a hydroxyl group, a carboxyl group, an acid anhydride group, a carbonyl group, an ester group, an epoxy group, an amino group, a substituted amino group, a carbamoyl group, a nitro group, a cyano group, an oxetanyl group, and a halogen atom.

8. A resin composition according to claim 7, which comprises:

a curing agent, wherein the hydrosilylatable compound has a group containing a carbon-carbon unsaturated bond and an epoxy group.

9. A resin composition according to claim 8, wherein the curing agent comprises a functional polysilane in which a hydrosilylatable compound is additionally bonded to a polysilane having a structural unit represented by the following formula (1):

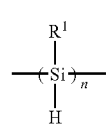

wherein $R^1$ represents a hydrogen atom, an organic group, or a silyl group; and "n" denotes an integer of not less than 1, the functional polysilane of the curing agent having at least one functional group selected from the group consisting of a hydroxyl group, a carboxyl group, an acid anhydride group, and an amino group.

10. A resin composition according to claim 7, which comprises:

a thermosetting or photo-curable resin.

11. A resin composition according to claim 10, wherein the thermosetting or photo-curable resin comprises an epoxy resin or a polysilane having a terminal silanol group.

* * * * *

UNITED STATES PATENT AND TRADEMARK OFFICE
CERTIFICATE OF CORRECTION

PATENT NO. : 8,163,863 B2
APPLICATION NO. : 12/096050
DATED : April 24, 2012
INVENTOR(S) : Hiroki Sakamoto It is certified that error appears in the above-identified patent and that said Letters Patent is hereby corrected as shown below:

Claim 7, column 38, line 66 replace "the proportion of the structural unit represented by the formula (1) relative to the branched structural unit [the former/the latter (molar ratio)1 is 90/10 to 3/97 in terms of silicon atom, and"

with --the proportion of the structural unit represented by the formula (1) relative to the branched structural unit [the former/the latter (molar ratio)] is 90/10 to 3/97 in terms of silicon atom, and--

Signed and Sealed this
Seventh Day of August, 2012

David J. Kappos
*Director of the United States Patent and Trademark Office*